(12) United States Patent
Yamaku et al.

(10) Patent No.: US 11,128,814 B2
(45) Date of Patent: Sep. 21, 2021

(54) IMAGE PROCESSING APPARATUS, IMAGE CAPTURING APPARATUS, VIDEO REPRODUCING SYSTEM, METHOD AND PROGRAM

(71) Applicant: Vecnos Inc., Kanagawa (JP)

(72) Inventors: Toru Yamaku, Tokyo (JP); Yukio Kozaki, Tokyo (JP); Hironori Irie, Kanagawa (JP)

(73) Assignee: Vecnos Inc., Kanagawa (JP)

(*) Notice: Subject to any disclaimer, the term of this patent is extended or adjusted under 35 U.S.C. 154(b) by 0 days.

(21) Appl. No.: 16/699,428

(22) Filed: Nov. 29, 2019

(65) Prior Publication Data

US 2020/0177824 A1   Jun. 4, 2020

(30) Foreign Application Priority Data

Nov. 30, 2018 (JP) .............................. JP2018-225857
Oct. 15, 2019 (JP) .............................. JP2019-188616

(51) Int. Cl.
*H04N 5/262* (2006.01)
*H04N 5/232* (2006.01)
(Continued)

(52) U.S. Cl.
CPC ............ *H04N 5/2628* (2013.01); *G06T 7/20* (2013.01); *G06T 7/70* (2017.01); *H04N 5/23238* (2013.01); *H04N 5/247* (2013.01); *H04N 5/265* (2013.01); *G06T 2207/10016* (2013.01); *G06T 2207/30244* (2013.01)

(58) Field of Classification Search
CPC ........... H04N 5/23238; H04N 5/23229; H04N 5/23267; H04N 5/247; H04N 5/2628; H04N 13/282; H04N 5/232; H04N 5/23258; H04N 5/225; H04N 5/2258; H04N 5/265; H04N 13/00; H04N 9/3185; H04N 5/2254; G06T 2207/10016; G06T 2207/30244; G06T 2207/10012; G06T 7/20; G06T 7/70;
(Continued)

(56) References Cited

U.S. PATENT DOCUMENTS

2009/0040308 A1* 2/2009 Temovskiy ........ G02B 27/0068
 348/158
2013/0229484 A1* 9/2013 Furumura ............ H04N 13/156
 348/36

(Continued)

FOREIGN PATENT DOCUMENTS

JP 2017-147682 A 2/2019

*Primary Examiner* — Sherrie Hsia
(74) *Attorney, Agent, or Firm* — Eversheds Sutherland (US) LLP

(57) ABSTRACT

Provided is an image processing apparatus that processes a video, including continuous images expressed by a coordinate system which includes at least an angular coordinate around a predetermined axis. The image processing apparatus includes: video data acquisition means that acquires video data; sensor data acquisition means that acquires sensor data corresponding to the video data; and rotation correction means that corrects the image to cancel rotation change around the reference axis based on the sensor data so that a reference of display of the image is fixed to a specific direction during the image capturing throughout a plurality of frames of the video.

14 Claims, 14 Drawing Sheets

(51) Int. Cl.
 *H04N 5/265* (2006.01)
 *H04N 5/247* (2006.01)
 *G06T 7/20* (2017.01)
 *G06T 7/70* (2017.01)

(58) Field of Classification Search
 CPC .................. G06T 1/0007; G06T 17/05; G06T 2219/2016; G06T 3/60; G06T 3/00; G03B 37/00
 USPC ...... 348/36–38, 42, 583, 580; 382/154, 293, 382/296, 297; 345/419, 649, 653, 7, 8; 396/324
 See application file for complete search history.

(56) References Cited

U.S. PATENT DOCUMENTS

2015/0070350 A1\* 3/2015 Cape .................... B42D 25/355
  345/419
2020/0366839 A1\* 11/2020 Kawasaki ................. G06T 3/60

\* cited by examiner

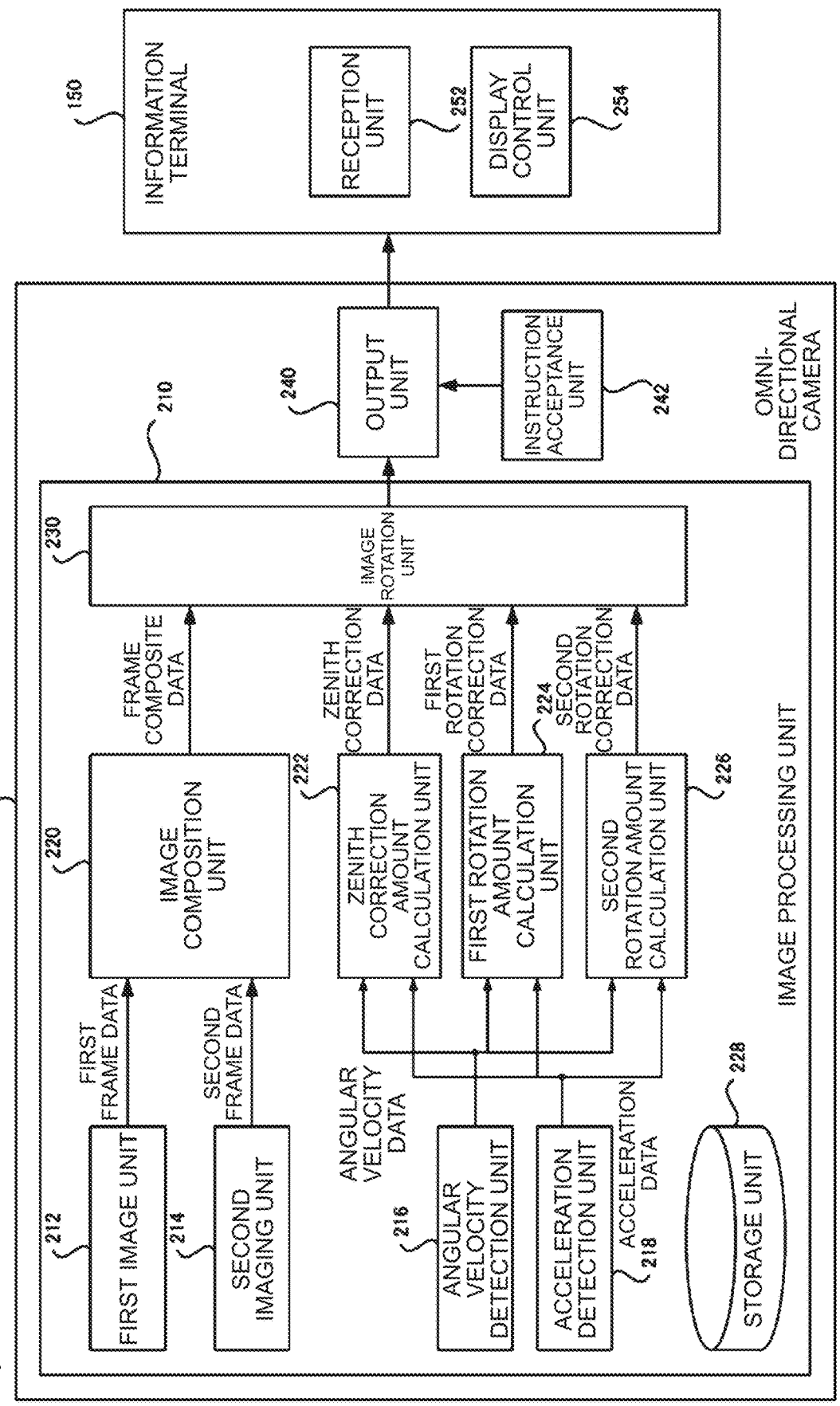

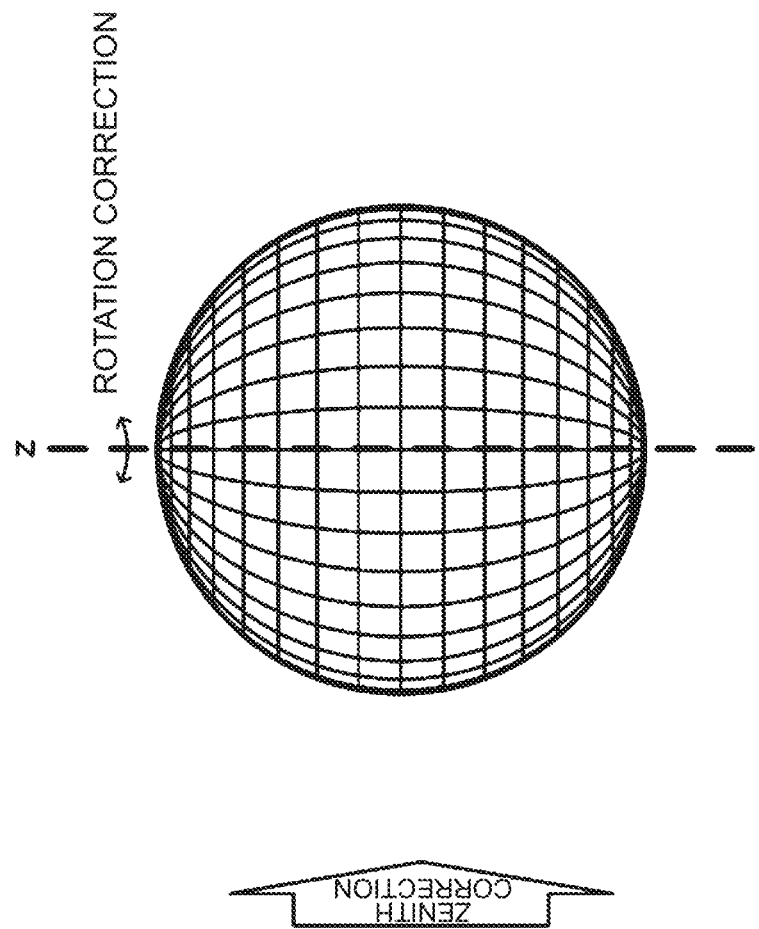
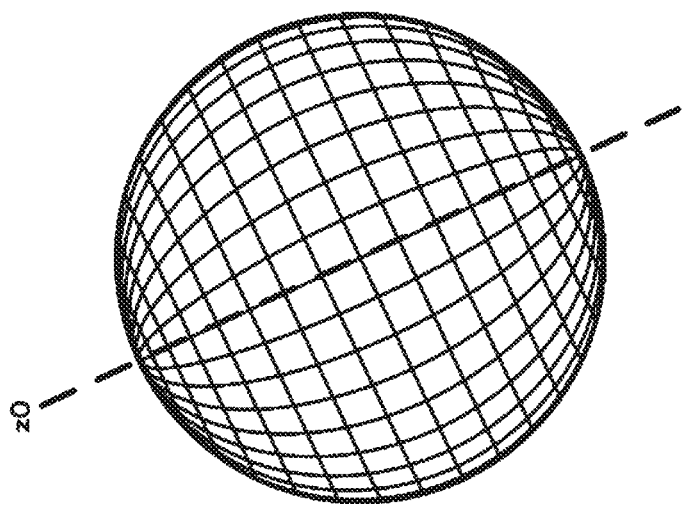
FIG. 6

ROTATION
CORRECTION

IMAGE PROCESSING APPARATUS, IMAGE CAPTURING APPARATUS, VIDEO REPRODUCING SYSTEM, METHOD AND PROGRAM

BACKGROUND

Field

The present invention relates to an image processing apparatus, an image capturing apparatus, a video reproducing system, method and program.

Description of Related Art

In recent years, an omni-directional camera that can omni-directionally capture videos at an imaging spot is widely used. With this omni-directional camera, the user may not only capture images in a fixed state, but may also hold the camera and capture videos while moving. For such a case, a correction technique, to correct camera shake and inclination of the omni-directional camera to minimize blur of the video, is also known.

An omni-directional video captured by an omni-directional camera normally has an initial front direction when a viewer views the omni-directional video. Generally the front direction, when the viewer views the image, follows the front direction of the omni-directional camera (e.g. front direction of one of two lenses) when the omni-directional camera captured the image. However, in the case where the front direction while viewing follows the movement of the omni-directional when the image was captured, the image to be displayed changes considerably depending on the image capturing conditions set by a cameraman, as a result the viewer may experience motion sickness while viewing the image.

For example, it is assumed that a cameraman captures an image fixing the omni-directional camera to their head, and the front direction when viewing the image follows the movement of the omni-directional camera when capturing the image. In this case, if the cameraman turns their head to look around, the omni-directional video rotates considerably, which causes the viewer to experience motion sickness. Further, an extreme rotation of the omni-directional video may make the video difficult to see. Even when the omni-directional camera is hand held, instead of being fixed to the cameraman's head, for capturing the image, the same occurs if the front direction changes considerably during image capturing.

Patent Publication JP-A 2017-147682 discloses a configuration in which small shaking components on the horizontal plane in the global coordinates in the image data are removed by performing coordinate conversion for correction, whereby the omni-directional image is generated. However, in this case, the high frequency components of the shaking are corrected for rotation around the vertical axis, but the front direction when viewing still follows an intentional motion, such as the cameraman turning their head to look around, hence it is not sufficient to suppress motion sickness that the viewer experiences when viewing the image.

SUMMARY

With the foregoing in view, it is an object of the present invention to provide an image processing apparatus that can suppress motion sickness of the viewer when viewing a video, caused by rotation around the reference axis when the video is captured.

To solve the problem, the present invention provides an image processing apparatus that processes a video, including continuous images expressed by a coordinate system which includes at least an angular coordinate around a predetermined axis. This image processing apparatus includes video data acquisition means that acquires video data, and sensor data acquisition means that acquires sensor data corresponding to the video data. This image processing apparatus further includes rotation correction means that corrects the image to cancel rotation change around the reference axis based on the sensor data, so that a reference of display of the image is fixed to a specific direction during image capturing throughout a plurality of frames of the video.

By the above configuration, the motion sickness of the viewer when viewing a video, caused by the rotation around the reference axis during image capturing, can be suppressed.

BRIEF DESCRIPTION OF DRAWINGS

FIG. 4 is a block diagram depicting major functions related to the omni-directional video reproducing functions that are implemented by the omni-directional video system according to the embodiment;

FIG. 6 is a diagram depicting a zenith correction and a rotation correction of an omni-directional image according to the embodiment;

DETAILED DESCRIPTION

An embodiment of the present invention will now be described. However, the present invention is not limited to the embodiment to be described below. In the following embodiment, an example of an image processing apparatus (and image capturing apparatus) and an example of a video reproduction system will be described using an omni-directional camera and an omni-directional video system respectively.

A general configuration of the omni-directional video system according to this embodiment will be described with reference to FIG. 1 to FIG. 3.

Figure 1:
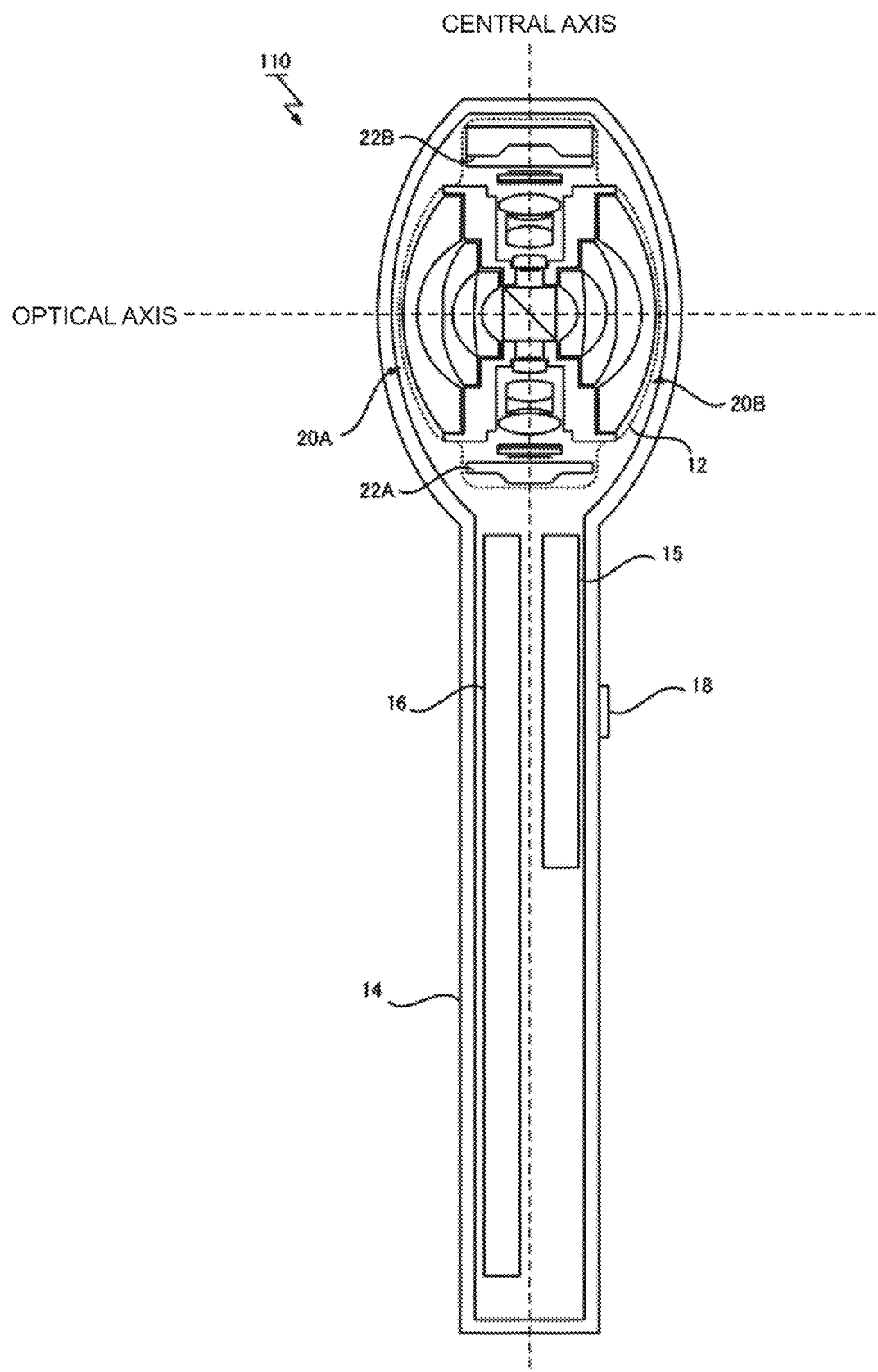
FIG. 1 is a cross-sectional view of an omni-directional camera constituting an omni-directional video system according to the embodiment.

FIG. 1 is a cross-sectional view of an omni-directional camera 110 constituting the omni-directional video system according to this embodiment. The omni-directional camera 110 illustrated in FIG. 1 includes: an image capturing body 12; a housing 14 that holds the image capturing body 12 and such components as a controller 15 and a battery 16; and a shutter button 18 disposed on the housing 14.

The image capturing body 12 illustrated in FIG. 1 includes: two imaging optical system 20A and 20B; and two image capturing elements 22A and 22B, such as charge coupled device (CCD) sensors and complementary metal oxide semiconductor (CMOS) sensors. Each imaging optical system 20 is configured as a 6-group 7-element fisheye lens, for example. According to the embodiment illustrated in FIG. 1, the fisheye lens has an angle of view wider than 180° (=360°/n; number of optical systems n=2), preferably 185° or more and more preferably 190° or more. An optical system combining one imaging optical system 20 and one image capturing element 22 having such a wide angle of view is referred to as a "wide angle imaging optical system". In the embodiment to be described below, a case where a number of optical systems is two will be described as an example, but the number of optical systems may be one or three or more if an image of a wide angle region can be captured. The imaging optical system is not limited to the fisheye lens that has a 180° or wider angle of view.

In the embodiment illustrated in FIG. 1, the imaging optical systems 20A and 20B have the same specifications, and are combined in opposite directions so that the optical axes thereof match with each other. The image capturing elements 22A and 22B convert the received light distribution into image signals, and sequentially output image frames to the image processing means on the controller. Images that are captured by the image capturing elements 22A and 22B respectively are combined, whereby an image of which solid angle is 4π steradian (hereafter called "omni-directional image") is generated. The omni-directional image captures all directions that can be seen from the input capturing spot. The omni-directional video is configured by continuous frames of the omni-directional image.

In the embodiment to be described here, it is assumed that an omni-directional image and an omni-directional video are generated, but this may be any image data having spherical or cylindrical image information, such as a whole sky image or whole sky video, a panoramic image or a panoramic video generated by capturing 360° only on the horizontal surface, or a hemispherical image or a semicylindrical image generated by capturing an image in a 180° angle of view. In other words, a video and images included in the video according to this embodiment is an image expressed by a coordinate system, including an angular coordinate, around a predetermined axis. In the case of an omni-directional image or a video, a hemispherical image or a video, and a partial spherical image, images are expressed by a spherical coordinate system including the angular coordinate which indicates an angle formed by a predetermined axis and the radius vector when the radius vector is a constant (e.g. 1), and the angular coordinate around the predetermined axis. In the case of the panoramic image or video, or a partial image thereof, images are expressed by a cylindrical coordinate system including a coordinate in the axis direction of the cylinder, and an angular coordinate around this axis, when the radius vector is a constant (e.g. 1).

Figure 2:
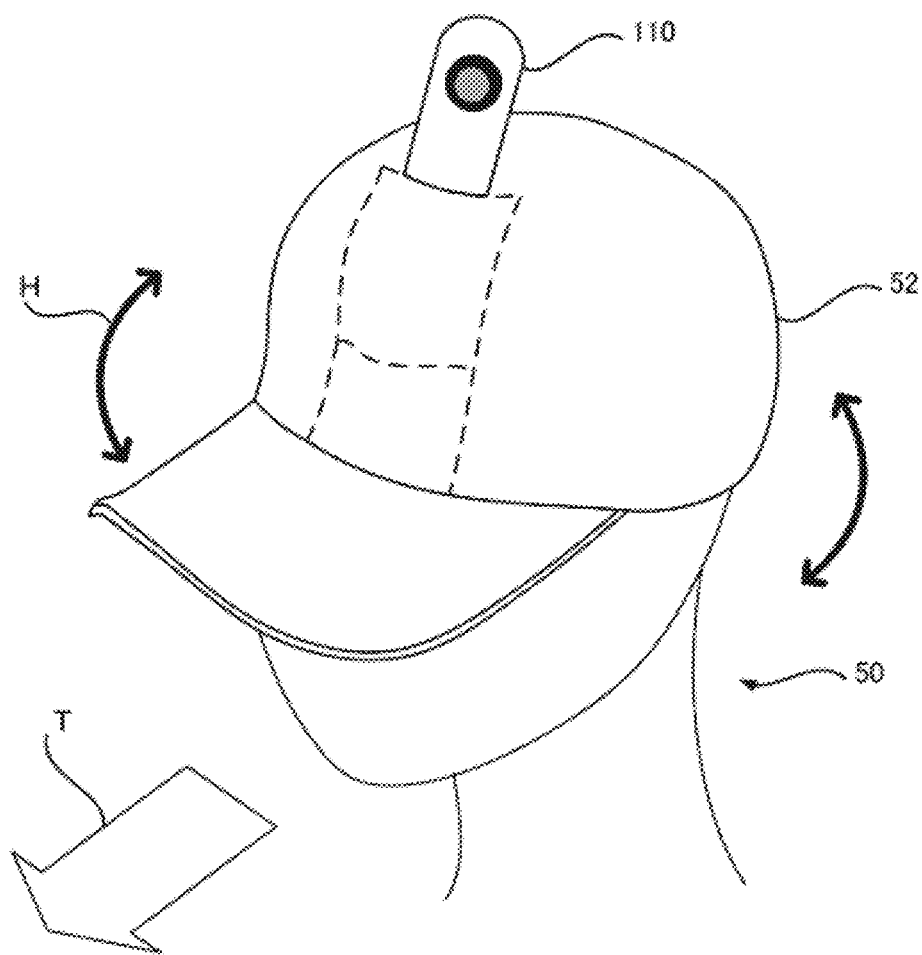
FIG. 2 is a diagram depicting the case of fixing the omni-directional camera according to the embodiment to the head of a cameraman.

FIG. 2 is a diagram depicting a case of fixing the omni-directional camera 110 in FIG. 1 to the head 50 of a cameraman. FIG. 2 is an example when the omni-directional camera 110 is fixed to a hat type fixture 52. As illustrated in FIG. 2, when the omni-directional camera 110 is fixed to the head 50 of the cameraman, the image capturing front direction of the image data that is captured by the omni-directional camera 110, follows the head motion H of the cameraman. The image capturing front direction is a direction that is set in advance, and is a reference direction that is displayed when the video data is reproduced. FIG. 2 also indicates the traveling direction T of the cameraman. In some cases, the cameraman travels while looking around, and the image capturing front direction following the head motion H is not always the same as the traveling direction T. Besides fixing the omni-directional camera 110 to the head 50 by fixing the camera 110 to the hat type fixture 52 as illustrated in FIG. 2, the omni-directional camera 110 may be directly fixed to the head 50 (e.g. helmet or hat, having functions of the omni-directional camera built in).

Figure 3B:
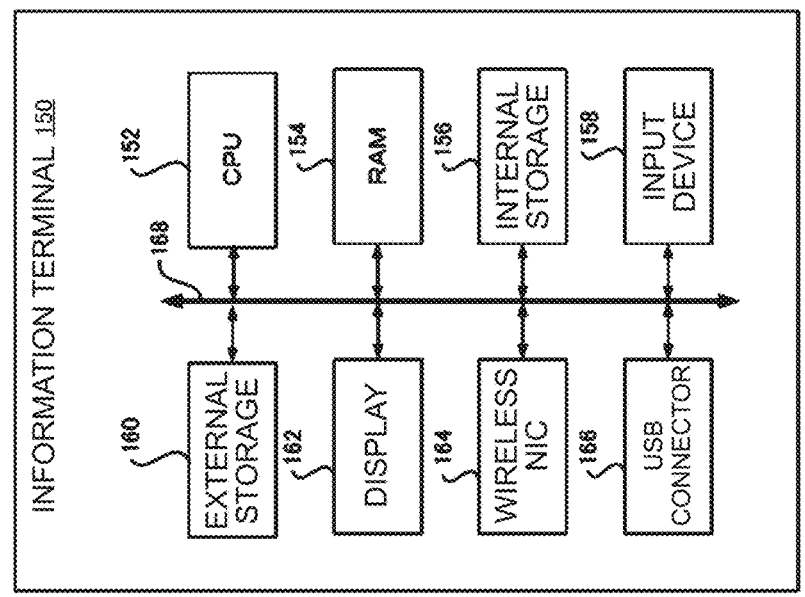
FIG. 3A and FIG. 3B are block diagrams depicting hardware of the omni-directional video system according to the embodiment.
Figure 3A:
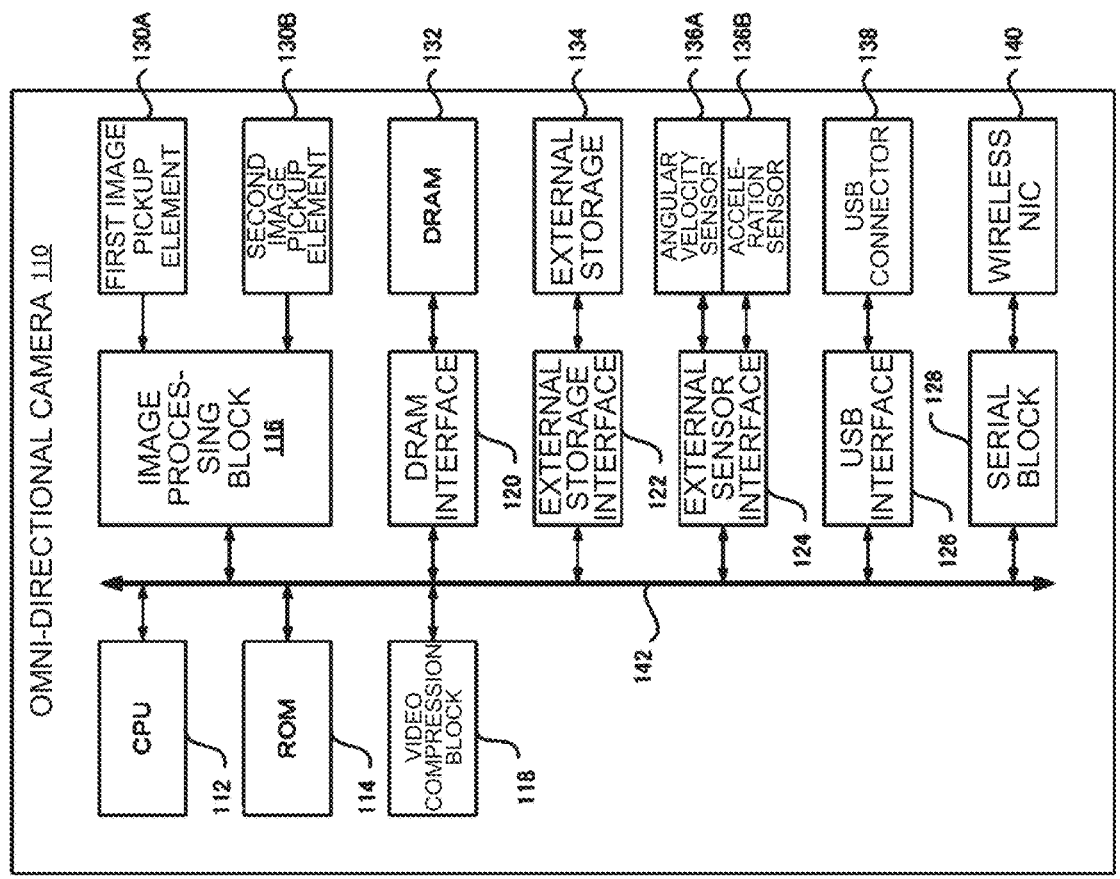

FIG. 3A indicates a hardware configuration of the omni-directional camera 110 constituting the omni-directional video system according to this embodiment. The omni-directional camera 110 corresponds to an image processing apparatus or an image capturing apparatus in the embodiment to be described.

The omni-directional camera 110 includes a central processing unit (CPU) 112, a read only memory (ROM) 114, an image processing block 116, a video compression block 118, a dynamic random access memory (DRAM) 132 which is connected via a DRAM interface 120, and a sensor 136 which is connected via an external sensor interface 124. Here the CPU 112, the ROM 114, the image processing block 116 and the video compression block 118 are mounted on the controller 15 illustrated in FIG. 1.

The CPU 112 controls the operation of each component of the omni-directional camera 110 and the general operation thereof. The ROM 114 stores an operating system (OS), the control programs and various parameters which are written in coding that the CPU 112 can decode. The image processing block 116 is connected to two image capturing elements 130A and 130B (image capturing elements 22A and 22B illustrated in FIG. 1), and images signals for images captured by each image capturing element are inputted to the image processing block 116. The image processing block 116 includes an image signal processor (ISP) and performs the shading correction, Bayer interpolation, white balance correction, gamma correction and the like on image signals inputted from the image capturing elements 130.

The video compression block 118 is a codec block which performs MPEG-4 AVC/H. 264 based compression and decompression on videos, for example. The DRAM 132 provides a storage area which temporarily stores data when various signal processing and image processing are performed.

In the embodiment depicted in FIG. 3A, the sensor 136 includes an angular velocity sensor 136A and an acceleration sensor 136B. The angular velocity sensor 136A is a sensor that detects the angular velocity components of three axes. The acceleration sensor 136B is a sensor that detects the acceleration components of three axes. The detected angular velocity components and acceleration components are used to perform zenith correction of the omni-directional image in the gravity direction and rotation correction around the gravity direction. The sensor 136 may include other sensors, such as a geomagnetic sensor (also called "electronic compass") to determine the azimuth angle and the like, and the azimuth angle may be used for the rotation correction around the gravity direction.

The omni-directional camera 110 further includes an external storage interface 122, a universal serial bus (USB) interface 126 and a serial block 128. An external storage 134 is connected to the external storage interface 122. The external storage interface 122 controls the reading and writing of the external storage 134, such as a memory card inserted into a memory card slot. A USB connector 138 is connected to the USB interface 126. The USB interface 126 controls USB communication with an external device (e.g. smartphone) that is connected via the USB connector 138. The serial block 128, to which a wireless network interface card (NIC) 140 is connected, controls serial communication with an external device (e.g. smartphone).

When the power is turned ON by operating a power switch, the above-mentioned OS and control programs are loaded to the main memory. The CPU 112 controls operation of each component of the apparatus according to the program read to the main memory, and temporarily stores data that is required for control, to a memory. Thereby each functional unit and processing of the omni-directional camera 110, which will be described later, is implemented.

FIG. 3B indicates a hardware configuration of an information terminal 150 constituting the omni-directional video system according to the embodiment. The information terminal 150 corresponds to an information processing apparatus according to the embodiment to be described.

The information terminal 150 indicated in FIG. 3B includes a CPU 152, a RAM 154, an internal storage 156, an input device 158, an external storage 160, a display 162, a wireless NIC 164 and a USB connector 166.

The CPU 152 controls operation of each component of the information terminal 150 and general operation thereof. The RAM 154 provides a work area for the CPU 152. The internal storage 156 stores an operating system written in coding that the CPU 152 can decode, and control programs (e.g. applications) which control processing on the information terminal 150 side according to this embodiment. The CPU 152 may be constituted by a plurality of CPUs.

The input device 158 is a touch screen, for example, and provides a user interface. The input device 158 receives various instructions (e.g. correction of omni-directional video) by an operator. The external storage 160 is a removable recording medium that is inserted into a memory card slot or the like, and records various data, such as video data and still image data. The display 162 displays the omni-directional video, which was corrected in response to the user operation, on the screen. The wireless NIC 164 establishes connection of wireless communication with an external apparatus (e.g. omni-directional camera 110). The USB connector 166 implements USB connection with an external apparatus (e.g. omni-directional camera 110).

When the power is turned ON by supplying power to the information terminal 150, a control program is read from the internal storage 156 and loaded to the RAM 154. The CPU 152 controls operation of each component of the apparatus according to the control program read to the RAM 154, and temporarily stores data that is required for control, to a memory. Thereby each functional unit and processing of the information terminal 150, which will be described later, is implemented.

The omni-directional video reproducing function of the omni-directional video system according to this embodiment will be described with reference to FIG. 4 to FIG. 9.

FIG. 4 indicates major functional blocks 200 related to the omni-directional video reproducing functions that are implemented on the omni-directional video system according to this embodiment. As depicted in FIG. 4, the functional blocks of the omni-directional camera 110 includes an image processing unit 210 and an output unit 240. The image processing unit 210 includes a first image capturing unit 212, a second image capturing unit 214, an angular velocity detection unit 216, an acceleration detection unit 218, an image composition unit 220, a zenith correction amount calculation unit 222, a first rotation amount calculation unit 224, a second rotation amount calculation unit 226, a storage unit 228 and an image rotation unit 230. Processing of each component is implemented by the CPU 112 or the image processing block 116 of the controller 15 executing various programs.

The functional blocks of the information terminal 150, on the other hand, includes a reception unit 252 and a display control unit 254, as depicted in FIG. 4. Processing of each component is implemented by the CPU 152 of the information terminal 150 executing various programs.

The functional blocks on the omni-directional camera 110 side will be described first.

The first image capturing unit 212 sequentially captures images using the image capturing element 130A, and generates fisheye images A which are continuous in a time series. The second image capturing unit 214 sequentially captures images using the image capturing element 130B, and generates fisheye images B which are continuous in a time series. The image composition unit 220 performs stitching processing for the fisheye images A which are continuous in a time series (first frame data) and fisheye images B which are continuous in a time series (second frame data), so as to generate frame composite data. The frame composite data is video data to be the base of the omni-directional video data, which includes a plurality of frames constituting the omni-directional video from the start to the end of image capturing. The fisheye image A and the fisheye image B are partial images that constitute the omni-directional image, and the first frame data and second frame data are video data that constitute the omni-directional video, including the frames of the partial images from the start to the end of image capturing respectively. The image composition unit 220 outputs the generated frame composite data to the image rotation unit 230. The first image capturing unit 212, the second image capturing unit 214 and the image composition unit 220 can constitute the image capturing means according to this embodiment.

Figure 5A:
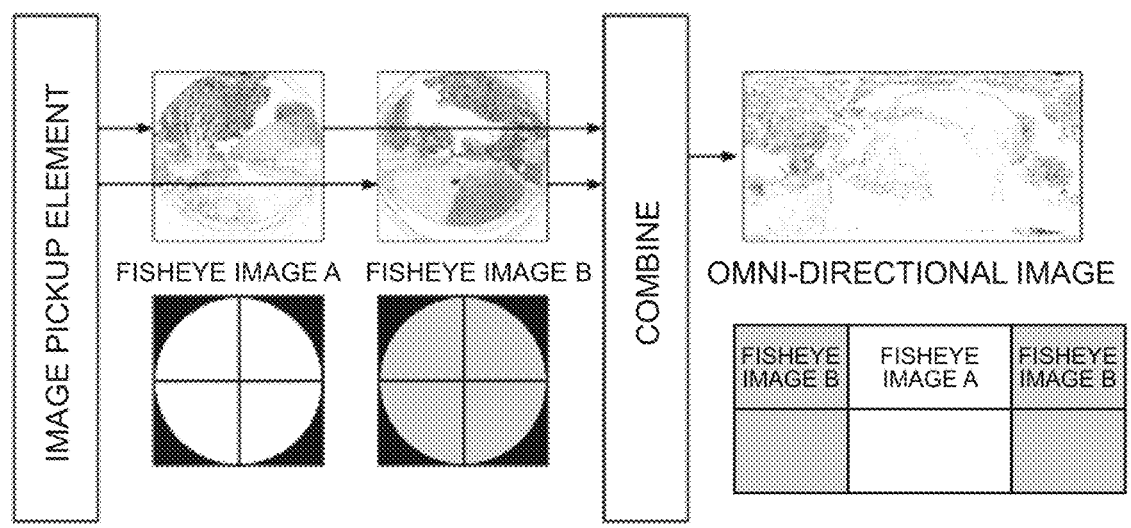
FIG. 5A is a diagram depicting an image data flow when the omni-directional image is generated.

Generation of an omni-directional image and the omni-directional image to be generated will be described with reference to FIG. 5. FIG. 5A depicts the data structure of each image in the omni-directional image generation and the data flow of the images. An image directly captured by each image capturing element 130 is generally an omni-directional image of which hemispherical portion is in a visual field. The light that entered the imaging optical system forms an image in a light-receiving region of the image capturing element 130 in accordance with a predetermined projection system. The image captured here is an image captured by a two-dimensional image capturing element of which light-receiving region is a plane area, and has image data expressed in the plane coordinate system. Typically, an image to be acquired is a fisheye image which includes the entire image circle where each image capturing image is projected, as indicated in "fisheye image A" and "fisheye image B" in FIG. 5A.

A plurality of fisheye images in each frame captured by the plurality of image capturing elements 130 are combined while distortions thereof are corrected, so as to generate one omni-directional image corresponding to each frame. In the combining processing, each hemispherical image, which includes a hemispherical portion that complements the other hemispherical portion, is generated from each fisheye image that is formed as a plane image. Then the two hemispherical images, each of which includes a hemispherical portion, are stitched (image combining) based on the matching overlapping regions, whereby an omni-directional image, which includes the entire celestial sphere, is generated.

Figure 5B:
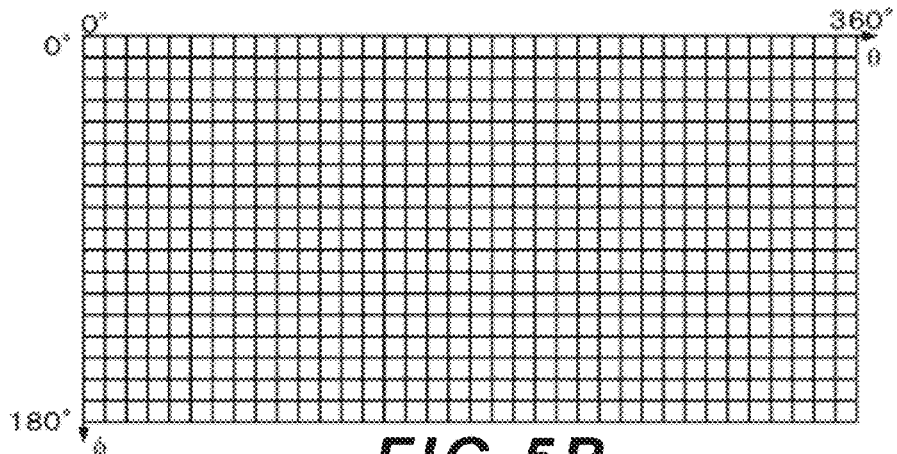
FIG. 5B is a diagram depicting a data structure of an omni-directional image expressed by a plane.
Figure 5C:
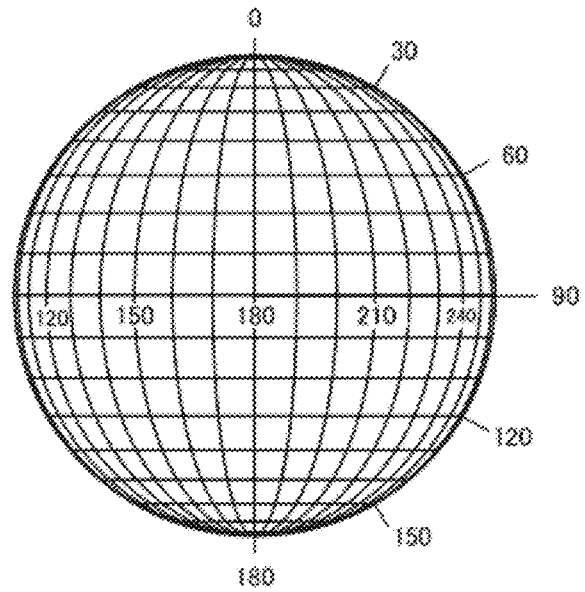
FIG. 5C is a diagram depicting the data structure expressed by a spherical surface.

FIG. 5B is a diagram depicting a data structure of an image data of the omni-directional image according to this embodiment, expressed by a plane surface. FIG. 5C is a diagram depicting the data structure of the image data of the omni-directional image expressed by a spherical surface. As illustrated in FIG. 5B, the image data of the omni-directional image is expressed by an array of pixel values on coordinates of a vertical angle $\phi$ with respect to a predetermined axis, and a horizontal angle $\theta$ corresponding to the rotation angle around the predetermined axis. The vertical angle $\phi$ is in the 0° to 180° (or −90° to +90°) range, and the horizontal angle $\theta$ is in the 0° to 360° (or −180° to +180°) range.

Each coordinate value ($\phi$, $\theta$) of the omni-directional format corresponds to each point on the spherical surface, which expresses all directions centered on an image capturing spot, as illustrated in FIG. 5C, and all directions are corresponded to directions on the omni-directional image. The plane coordinates of a fisheye image captured by the fisheye lens and coordinates on the sphere of the omni-directional image are corresponded in a predetermined conversion table. Data of the conversion table is created in advance by a manufacturer or the like according to a predetermined projection model, based on design data and the like of the respective lens optical system, and is data used to convert a fisheye image into an omni-directional image.

In the embodiment described here, the fisheye image is converted into the omni-directional image, and the frame composite data after the stitching processing is rotated by the image rotation unit 230. However, the sequence of the conversion processing, the combining processing and the rotation processing is not especially limited. The image rotation unit 230 may rotate (correct) the partial images, that is, the fisheye image A and the fisheye image B (two hemispherical images including the complementary hemispherical portions generated by converting the fisheye image A and fisheye image B) respectively, then the stitching processing may be performed. Instead of performing the rotation processing on the image in the omni-directional format, the rotation processing may be incorporated in the conversion table that is used to convert the fisheye image into the omni-directional image, so that the omni-directional image after the rotation processing is acquired from the fisheye image A and fisheye image B based on this conversion table, which is generated by incorporating the rotation processing. In this embodiment, correcting a video refers to acquiring a video, including an image in which a predetermined correction has been performed, regardless the sequence of the conversion processing, the combining processing and the rotation processing. In this embodiment, the omni-directional image is created by stitching the two fisheye images, but the present invention is not limited to this, and according to another embodiment, an omni-directional image or a panoramic image may be generated by stitching three or more images, for example.

Here FIG. 4 is again referred to. The angular velocity detection unit 216 is an angular velocity detection mechanism that includes an angular velocity sensor 136A, whereby when an image is being captured, the angular velocity detection unit 216 outputs angular velocity data that is acquired by measuring the angular velocity components around three axes directions using the angular velocity sensor 136A. The angular velocity data is time series data of the angular velocity around the three axes of the omni-directional camera 110 (angular velocity sensor 136A thereof) from the start to the end of the image capturing. The angular velocity data need not be recorded as a one-to-one correspondence with the frames, and normally the angular velocity data can be recorded at a rate faster than the frame rate. In this case, the correspondence with each frame can be determined later using a time stamp. The angular velocity may be recorded as a one-to-one correspondence with each frame of the omni-directional video. In this embodiment, the angular velocity detection unit 216 constitutes the recording means that records the sensor data in association with each frame of the video, and the angular velocity data is included in the sensor data according to this embodiment.

The acceleration detection unit 218 is an acceleration detection mechanism that includes an acceleration sensor 136B, and while an image is being captured, the acceleration detection unit 218 outputs acceleration data that is acquired by measuring the acceleration components in the three axes directions using the acceleration sensor 136B. The acceleration data is time series data of acceleration around the three axes of the omni-directional camera 110 (acceleration sensor 136B thereof) from the start to the end of the image capturing. The acceleration data need not be recorded as a one-to-one correspondence with the frames, and normally the acceleration data can be recorded at a rate faster than the frame rate. In this case, the correspondence with each frame can be determined later using a time stamp. The acceleration may be recorded as a one-to-one correspondence with each frame of the omni-directional video. In this embodiment, the acceleration detection unit 218 constitutes the recording means that records the sensor data in association with each frame of the video, and the acceleration data is included in the sensor data according to this embodiment.

The acceleration data and the angular velocity data, which are directly acquired by the acceleration sensor 116B and the angular velocity sensor 136A, are data based on the three axes directions of the sensor coordinate system (or coordinate system of the omni-directional camera 110). On the other hand, the acceleration sensor 136B outputs the sum of the acceleration based on the motion and gravitational acceleration, and the above-mentioned acceleration data and the angular velocity data can be converted into data on the absolute coordinate system based on the gravitational acceleration axis. Therefore, the above-mentioned sensor data indicates the displacement amount in the absolute coordinate system.

The zenith correction amount calculation unit 222 calculates the inclination angle during image capturing, with respect to the reference axis in each frame, based on the acceleration data outputted from the acceleration detection unit 218. The zenith correction data is recorded in association with each frame of the omni-directional video, and is time series data of the inclination angle of the omni-directional camera 110 with respect to the reference axis from the start to the end of the image capturing. The inclination angle with respect to the reference axis is typically expressed as a vector constituted of a dimensional value of the acceleration. The reference axis normally matches with the gravity direction in which the gravitational acceleration is acting, and in the following description, it is assumed that the reference axis is in the gravity direction. The acceleration sensor 136B does not distinguish between the gravity and the inertial force, hence the inclination angle acquired from the acceleration sensor 136B may preferably be corrected based on the signal measured by the angular velocity sensor 136A.

Based on the acceleration data that is outputted from the acceleration detection unit 218 and the angular velocity data that is outputted from the angular velocity detection unit 216, the first rotation amount calculation unit 224 calculates, for each frame, a vector of the image capturing front of the omni-directional camera 110 in the coordinate system on the plane (horizontal plane) that is vertical to the gravity direction, from the change amount of the relative angle of the omni-directional camera 110, and records the first rotation correction data. The first rotation correction data is recorded in association with each frame of the omni-directional video, and is time series data of the angle change amount of the image capturing front direction, with respect to the reference value from the start to the end of the image capturing. The angle change amount of the image capturing front direction is expressed by a difference between the image capturing front direction on the horizontal plane based on the posture of the omni-directional camera 110 in the reference frame and the image capturing front direction on the horizontal plane based on the posture of the omni-directional camera 110 in the target frame. Here the reference frame can be a frame at the image capturing start timing, or a frame at a start timing of applying this correction (in the case of an embodiment where the correction can be instructed after image capturing is started). The first rotation correction data is expressed by a digitized rotation angle or a vector, for example. In this embodiment, the first rotation correction data is also included in the sensor data, and the first rotation amount calculation unit 224 can constitute the sensor data acquisition means and the recording means that acquire and record the sensor data in association with each frame of the video according to this embodiment.

Based on the acceleration data that is outputted from the acceleration detection unit 218 and the angular velocity data that is outputted from the angular velocity detection unit 216, the second rotation amount calculation unit 226 calculates, for each predetermined number of frames, a vector of the traveling direction of the omni-directional camera 110 in the plane coordinate system on the plane (horizontal plane) that is vertical to the gravity direction, and generates the second rotation correction data. The traveling direction in the frame at the start of the image capturing is the same as the image capturing front direction of the omni-directional camera 110 in the frame at the start of the image capturing. The second rotation correction data is recorded in association with each frame and a specified number of frames of the omni-directional video, and is time series data of the angle change amount of the traveling direction with respect to the reference value from the start to the end of the image capturing. The angle change amount of the traveling direction is expressed by a difference between the traveling direction on the horizontal plane of the omni-directional camera 110 in the reference frame (image capturing front direction) and the traveling direction on the horizontal plane of the omni-directional camera 110 in the target frame. The second rotation correction data is expressed by a digitized rotation angle or a vector, for example. In this embodiment, the second rotation correction data is also included in the sensor data, and the second rotation amount calculation unit 226 can constitute the sensor data acquisition means and the recording means that acquires and records the sensor data in association with each frame of the video according to this embodiment.

For the change in the traveling direction, when an acceleration in a specific direction of the omni-directional camera 110, out of the acceleration data, satisfies a predetermined condition, this specific direction is determined as the traveling direction. The predetermined condition is, for example, an acceleration in a specific direction that exceeds a predetermined threshold when vectors of a plurality of frames are combined. If a predetermined condition is not satisfied, the traveling direction may be unchanged from the data of the previous frame. The definition of the traveling direction is not especially limited, and may be a traveling direction of the cameraman or may be a traveling direction of the camera. The second rotation amount calculation unit 226 can also function as determination means according to this embodiment.

The image rotation unit 230 acquires the frame composite data, the zenith correction data, the first rotation correction data and the second rotation correction data outputted from the image composition unit 220, the zenith correction amount calculation unit 222, the first rotation amount calculation unit 224 and the second rotation amount calculation unit 226 respectively. The image rotation unit 230 performs the rotation processing (zenith correction and rotation correction) based on the acquired zenith correction data, the first rotation correction data and the second rotation correction data, for each frame of the acquired frame composite data, and outputs the corrected omni-directional frame data.

Figure 7A:
FIG. 7A and FIG. 7B are diagrams depicting an omni-directional image acquired by the zenith correction and the rotation correction of an omni-directional image according to the embodiment.
Figure 7B:
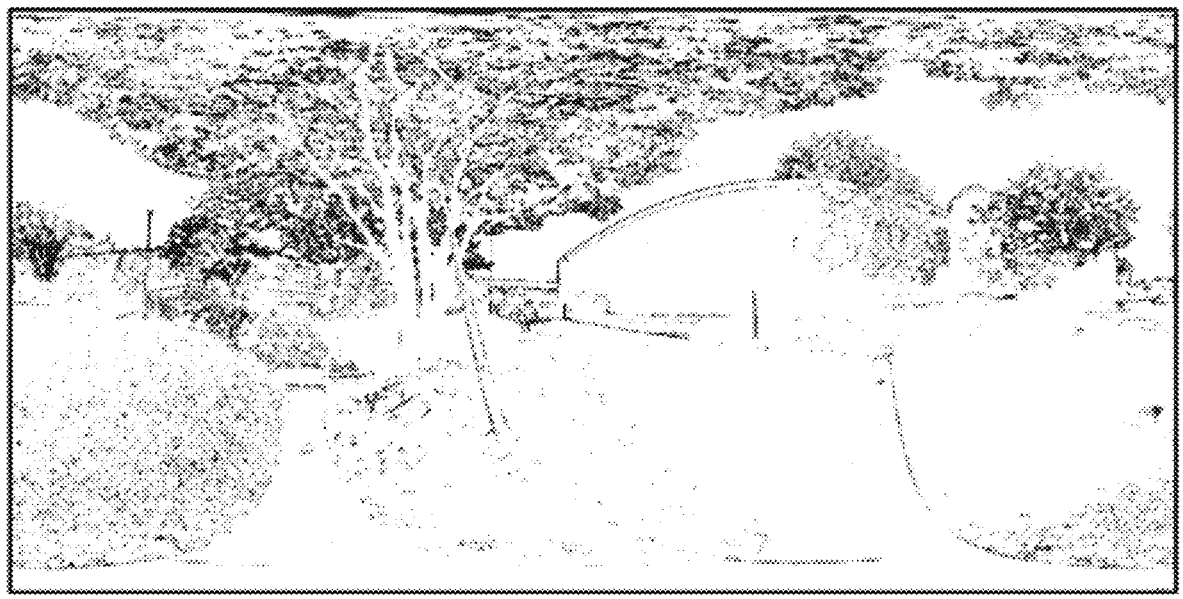

Now the zenith correction and the rotation correction will be described with reference to FIG. 6 and FIG. 7. FIG. 6 is a diagram depicting the zenith correction and the rotation correction of the omni-directional image that is performed according to this embodiment. FIG. 7A and FIG. 7B are diagrams depicting the omni-directional image acquired by the zenith correction and the rotation correction of the omni-directional image performed according to this embodiment. FIG. 7A indicates a frame of the video before the zenith correction, and FIG. 7B indicates a frame of the video after the zenith correction.

As described above, the image data in the omni-directional image format is expressed as an array of pixel values, of which coordinates are the vertical angle $\phi$ with respect to a predetermined axis $z0$, and the horizontal angle $\theta$ which corresponds to a rotation axis around the predetermined axis $z0$. Here the predetermined axis is an axis that is defined based on the omni-directional camera 110 if no correction is performed. For example, a central axis that passes through the center of the housing from the top (an image capturing body 12 side of the omni-directional camera 110 as illustrated in FIG. 1) to the bottom (the opposite side thereof), can be determined as the predetermined axis z0 which defines the horizontal angle θ and the vertical angle ϕ, whereby the omni-directional image can be defined. Further, the horizontal angle θ of the omni-directional image can be determined such that the optical axis direction of one optical element, out of the two imaging optical systems 20A and 20B, is positioned at the center at the horizontal angle θ, for example.

The zenith correction refers to a processing to correct an omni-directional image (FIG. 7A), which was captured in the state of the central axis z0 inclined with respect to the gravity direction, as illustrated on the left in FIG. 6, to an omni-directional image (FIG. 7B), which appears as if this image were captured in a state where the central axis z0 matched with the gravity direction Z, as illustrated on the right of FIG. 6 (correction in the roll and pitch directions). Based on the inclination angle with respect to the gravity direction in each frame included in the zenith correction data, the image rotation unit 230 functions as the zenith correction means that performs zenith correction for each frame, so that the predetermined axis (central axis) approximately matches with the gravity direction.

On the other hand, the rotation correction refers to a correction to cancel the angle change around the gravity direction Z (change in the horizontal angle θ direction in FIG. 7) in the omni-directional image, which has been corrected by the zenith correction so that the central axis z0 matches with the reference direction. Thereby the reference of display (e.g. reference position that is the center at the horizontal angle θ in the omni-directional format, and is displayed as a default when the video data is reproduced) can be fixed to a specific direction during the image capturing (correction in the yaw direction). The reference position that is displayed as the default refers to a region in the omni-directional format that is displayed when the user does not perform the operation to change the direction to display the video data. The specific direction is the front face direction of the omni-directional camera 110, for example. The image rotation unit 230 functions as the rotation correction means that performs correction to cancel the rotation change around the reference axis (which is matched with the gravity direction by the zenith correction) based on the first rotation correction data and the second rotation correction data.

Here the specific direction during image capturing, which is fixed to the reference of display after cancelling the angle change, may be the image capturing front direction on the horizontal plane of the omni-directional camera 110 in the reference frame described above. After the traveling direction of the omni-directional camera 110 is determined, the above-mentioned specific direction may be the traveling direction of the omni-directional camera 110 on the horizontal plane.

More specifically, the image rotation unit 230 performs correction to cancel the rotation change around the reference axis for each frame of the video based on the first rotation correction data and the second rotation correction data, so that the reference of display approximately matches with the specific direction during the image capturing, at least throughout a plurality of frames in a predetermined period. The amount of the rotation change that is cancelled here is based on the difference between the specific direction on the plane that is vertical to the reference axis (e.g. image capturing front direction or the traveling direction at the start of the image capturing), and the image capturing front direction on the plane that is vertical to the reference axis in the correction target frame. Further, the period in which the reference of display is fixed to a specific direction is from a timing when this specific direction is determined, to a timing when the specific direction is determined the next time.

In the following description of this embodiment, it is assumed that initially the reference of display (center of image) is fixed regarding the image capturing front direction on the horizontal plane of the omni-directional camera 110 in the reference frame as the specific direction, and after the traveling direction of the omni-directional camera 110 is determined, this traveling direction on the horizontal plane is determined as the specific direction, and the reference of display (center of image) is fixed to this traveling direction. In this case, regardless the head motion H illustrated in FIG. 2, the rotation is corrected so that the image capturing front direction at the start timing comes to the center of the image, and when the traveling direction T is eventually determined, the rotation is corrected so that this traveling direction T comes to the center of the image.

The method of determining the specific direction, however, is not especially limited. According to another embodiment, the reference position that is displayed as the default may always be fixed to the image capturing front direction on the horizontal plane of the omni-directional camera 110 in the reference frame, regardless the traveling direction T. In such an embodiment, the second rotation amount calculation unit 226 and the rotation correction using the second rotation correction data can be omitted. Further, in this case, the specific direction is not updated depending on the change in the traveling direction during the image capturing, therefore the period when the reference of display is fixed to the specific direction is the entire period from the timing of starting the video or the timing when the start of fixing is instructed to the timing of ending the video or the timing when the end of fixing is instructed.

The storage unit 228 is used to store the above mentioned first frame data, second frame data, frame composite data, corrected frame composite data after the zenith correction and rotation correction, acceleration data, angular velocity data, zenith correction data, first rotation correction data and second rotation correction data. The storage unit 228 is provided as a part of such storage areas as the DRAM 132, the external storage 134 and other storages indicated in FIG. 3A.

The omni-directional video acquired by one image capturing step may be recorded in the storage unit 228 as one file, for example. In this case, various methods are possible to record the omni-directional video.

For example, corrected frame composite data may be recorded as one omni-directional video data. In this case, the acceleration data, angular velocity data, zenith correction data, first rotation correction data and second rotation correction data may be arbitrarily recorded as meta data, along with the corrected frame composite data. In this embodiment, if the corrected data is required, corrected frame composite data is read.

According to another embodiment, the frame composite data before correction may be recorded as one omni-directional video data. In this case, a predetermined combination of the acceleration data, angular velocity data, zenith correction data, first rotation correction data and second rotation correction data are recorded as meta data along with the frame composite data before correction. In this embodiment, if corrected data is required, the zenith correction data, the first rotation correction data and the second rotation correction data are prepared from the meta data (insufficient data is calculated), and the image rotation unit 230 performs image rotation on the frame composite data before correction. For example, if the acceleration data and the angular velocity data are available, then insufficient data of the zenith correction data, the first rotation correction data and the second rotation correction data can be calculated.

The frame composite data after the image rotation unit 230 performed the zenith correction and the rotation correction is outputted to the output unit 240. The output unit 240 can output the corrected data to an external information terminal 150 as the video data via the wireless NIC 140 or the USB connector 138. The output unit 240 may output the file of the corrected data to a predetermined storage as the video data.

The "video" here may be recorded in any format if the video can be reproduced. For example, video data generated by compressing a plurality of frames using a predetermined codec, such as H. 264/MPEG-4 Advanced Video Coding (AVC), H.265/High Efficiency Video Coding (HEVC) or the like. As in the Motion Joint Photographic Experts Group (JPEG) format, which is a format to express videos as continuous still images, the video data may be recorded as a series of continuous still images in a plurality of frames, or as a set of files of still images in a plurality of frames. The output unit 240 includes an appropriate codec.

The functional blocks on the information terminal 150 side will be described next. The information terminal 150 is a terminal device which communicates with the omni-directional camera 110 and in which applications to read and reproduce the omni-directional image is installed. The information terminal 150 may be a smartphone, tablet computer, personal computer, head mount display (HMD) or the like. The information terminal 150 accepts various instructions from the operator via the applications, and issues various requests to the omni-directional camera 110. For example, responding to the acceptance of an instruction to reproduce a specified omni-directional video (e.g. instruction to reproduce a video after rotation correction was performed) from the operator, the information terminal 150 issues a request to the omni-directional camera 110 to send the video data after predetermined correction is performed on the omni-directional video.

The reception unit 252 of the information terminal 150 receives the video data that is outputted from the omni-directional camera 110. The display control unit 254 of the information terminal 150 displays the omni-directional video on a display device, such as the display 162 of the information terminal 150 based on the received video data. According to a specific embodiment, the display control unit 254 displays at least a part of the image of the corrected video data on the screen of the display 162 based on the above-mentioned reference of display. Further, the display control unit 254 changes the direction of display in the omni-directional format by the operation of the user, so as to change the region displayed on the screen of the display 162.

The image that is displayed based on the corrected image data, on the information terminal 150 side is arbitrary. For example, the display control unit 254 may display the entire omni-directional image on the display device, or may paste the omni-directional image on a spherical object and display an image, in the case where the spherical object is viewed from a predetermined position using a virtual camera having a predetermined angle of view, as frames of a video. In any case, in the omni-directional format, a predetermined reference of display is defined and based on this reference of display, an image in a specific field of view is displayed. For example, in the case of displaying an entire omni-directional image on the display 162, the omni-directional image can be displayed in a state where the specific direction is fixed to the center of the display 162. In the case where an image, which is viewed by a virtual camera, is displayed on the screen of the display 162, the omni-directional image is pasted on a spherical object based on the reference of the display. In this case, the specific direction during the image capturing is not fixed to the center of the display 162, but unless the display range (position and direction of the virtual camera) is changed, the predetermined direction (e.g. left side in the traveling direction) is always fixed at the center of the display 162.

In this embodiment, actual processing of the zenith correction and the rotation correction are performed not by the information terminal 150 but by resources on the omni-directional camera 110 side, and the correction result is outputted to and displayed on the information terminal 150. Because of this configuration, when the omni-directional camera 110 has sufficient resources, the video can be stably reproduced while performing the zenith correction and the rotation correction, regardless the processing performance of the information terminal 150.

According to the embodiment described here, the image data of the omni-directional image is outputted to the information terminal 150, but the present invention is not limited to this. If the omni-directional camera 110 includes a display device, the image data may be displayed on this display device.

According to the embodiment depicted in FIG. 4, the functional blocks of the omni-directional camera 110 may further include an instruction acceptance unit 242 in addition to the image processing unit 210 and the output unit 240. The instruction acceptance unit 242 can accept an instruction that specifies a specific direction during a video capture. In the above-mentioned embodiment, the specific direction is an image capturing front direction or a traveling direction at a predetermined timing, but if the instruction acceptance unit 242 is included, a direction to fix the image to the reference of the display (e.g. direction where target object exists) can be specified at an arbitrary timing during the image capturing. The instruction acceptance unit 242 constitutes the acceptance means according to this embodiment.

FIGS. 8A, 8B, 9A, and 9B are sequence diagrams depicting processing from capturing a video to viewing the video in the omni-directional video system according to various specific embodiments.

Figure 8A:
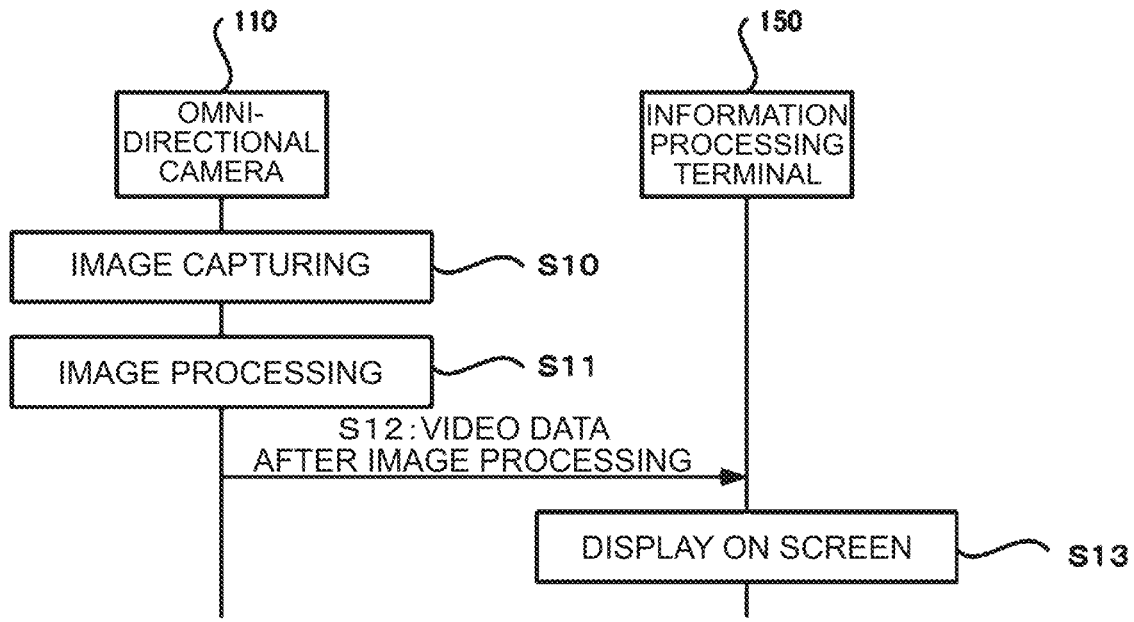
FIG. 8A and FIG. 8B are sequence diagrams depicting processing of the omni-directional video system according to specific embodiments, from capturing of a video to viewing the video.

FIG. 8A corresponds to the embodiment indicated in FIG. 4. In the case of the embodiment indicated in FIG. 8A, image capturing and image processing (including image combining, zenith correction and rotation correction) are performed on the omni-directional camera 110 side, and the video data after the image processing is sent to the information terminal 150. Then on the information terminal 150 side, the video data after the image processing is displayed on the screen. More specifically, according to the embodiment in FIG. 8A, the omni-directional camera 110 acquires the video data by the image capturing process in S10, performs image processing on the video data in S11, and sends the video data after the image processing to the information processing terminal in S12. In S13, the information processing terminal displays the video data on the screen of the display.

According to the embodiment indicated in FIG. 4 and FIG. 8A, the omni-directional camera 110 operates as an image processing apparatus that includes video data acquisition means (first image capturing unit 212, second image capturing unit 214, and image composition unit 220 when required), sensor data acquisition means (angular velocity detection unit 216, acceleration detection unit 218, first rotation amount calculation unit 224, and first rotation amount calculation unit 224) and rotation correction means (image rotation unit 230).

In FIG. 4 and FIG. 8A, an example of performing the image processing (including image combining, zenith correction and rotation correction) using resources on the omni-directional camera 110 side was described, but the present invention is not limited to this. For example, a part or all of the first frame data, second frame data, frame composite data, angular velocity data, acceleration data, zenith correction data, first rotation correction data and second rotation correction data may be sent to the information terminal 150, and a part of all of the image processing may be performed on the information terminal 150 side. In this case, the information terminal 150 performs a part of the functions on the omni-directional camera 110 side, indicated in the functional block diagram in FIG. 4, by the CPU 152 of the information terminal 150 executing various programs. Thereby a processing having a large load, such as the combing processing that the image composition unit 220 performs, to combine the first frame data (fisheye image A) and the second frame data (fisheye image B), can be executed using a CPU having a faster processing speed, and even data having a high number of pixels can be processed in a short time or in real-time.

Figure 8B:
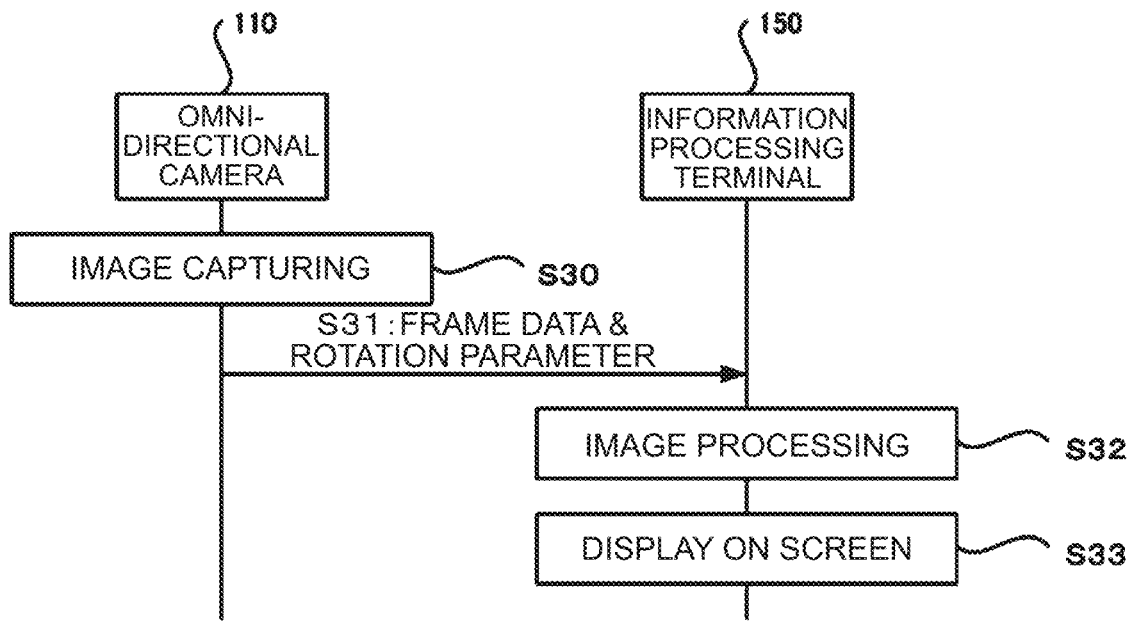

For example, according to the embodiment indicated in FIG. 8B, the omni-directional camera 110 only captures the image (S30), and the frame data before the image processing and the rotation parameter are sent to the information terminal 150 (S31). Here "rotation parameter" is a generic term for parameters related to the correction of the frame data, such as the above-mentioned acceleration data, angular velocity data, zenith correction data, first rotation correction data and second rotation correction data. The information terminal 150 performs such image processing as the zenith correction and the rotation correction on the received frame data, based on the received rotation parameter data (S32), and the video data after image processing is displayed on the screen (S33).

According to the embodiment indicated in FIG. 8B, the information terminal 150 operates as an image processing apparatus that includes video data acquisition means (reception unit), sensor data acquisition means (reception unit) and rotation correction means (means corresponding to the image rotation unit 230).

The image combining here may be performed by the omni-directional camera 110 or the information terminal 150. In the case of performing the image combining on the omni-directional camera 110 side, the frame data that is sent from the omni-directional camera 110 to the information terminal 150 is the frame composite data (omni-directional format). In the case of performing the image combining on the information terminal 150 side, the frame data that is sent from the omni-directional camera 110 to the information terminal 150 is the first frame data (fisheye image A) and the second frame data (fisheye image B). The first frame data and the second frame data may be sent as the corresponding video data respectively, or as one combined video data generated by combining the two fisheye images (video data of one image generated by combining the fisheye image A and the fisheye image B arranged side-by-side). In this case, the information terminal 150 includes means corresponding to the image composition unit 220 as the video data acquisition means.

The stage of data that is sent to the information terminal 150 as the rotation parameters is arbitrary. For example, the above-mentioned acceleration data and the angular velocity data may be sent to the information terminal 150 as the rotation parameters. In this case, the zenith correction data, first rotation correction data and second rotation correction data are calculated from the acceleration data and the angular velocity data on the information terminal 150 side. Further, in this case, the information terminal 150 includes the first rotation amount calculation unit 224 and means corresponding to the first rotation amount calculation unit 224 as the sensor data acquisition means. As an alternative, the zenith correction data, first rotation correction data and second rotation correction data may be sent to the information terminal 150 as the rotation parameters. In this case, it is sufficient that the information terminal 150 includes reception means that receives the zenith correction data, first rotation correction data and second rotation correction data.

In the embodiment described with reference to FIG. 4, FIG. 8A and FIG. 8B, the omni-directional video system is constituted of two apparatuses (omni-directional camera 110 and information terminal 150), but the present invention is not limited to this.

Figure 9A:
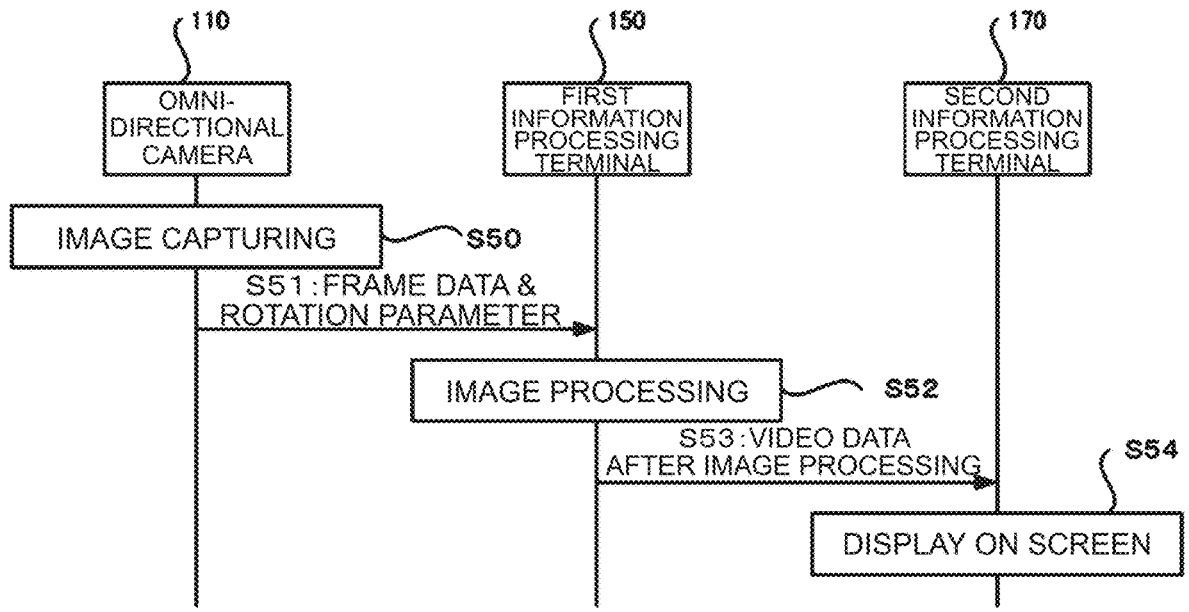
FIG. 9A and FIG. 9B are sequence diagrams depicting processing of the omni-directional video system according to other specific embodiments, from capturing a video to viewing the video.

For example, a second information terminal 170 that is connected to the first information terminal 150 may be included, as indicated in FIG. 9A. Here the second information terminal 170 is a head mount display, for example. According to the embodiment indicated in FIG. 9A, the omni-directional camera 110 performs only image capturing (S50), and the frame data and the rotation parameter before image processing are sent to the first information terminal 150 (S51). The first information terminal 150 performs the image processing, such as the zenith correction and rotation correction, on the received frame data (S52), and sends the video data after the image processing to the second information terminal 170 (S53). The second information terminal 170 displays the video data after the image processing on the screen of the display (S54).

According to the embodiment indicated in FIG. 9A, the first information terminal 150 operates as an image processing apparatus that includes the video data acquisition means (reception unit), sensor data acquisition means (reception unit) and rotation correction means (means corresponds to the image rotation unit 230). The image composition unit 220, first rotation amount calculation unit 224 and the means corresponding to the first rotation amount calculation unit 224 may be disposed either in the omni-directional camera 110 or the first information terminal 150.

Figure 9B:
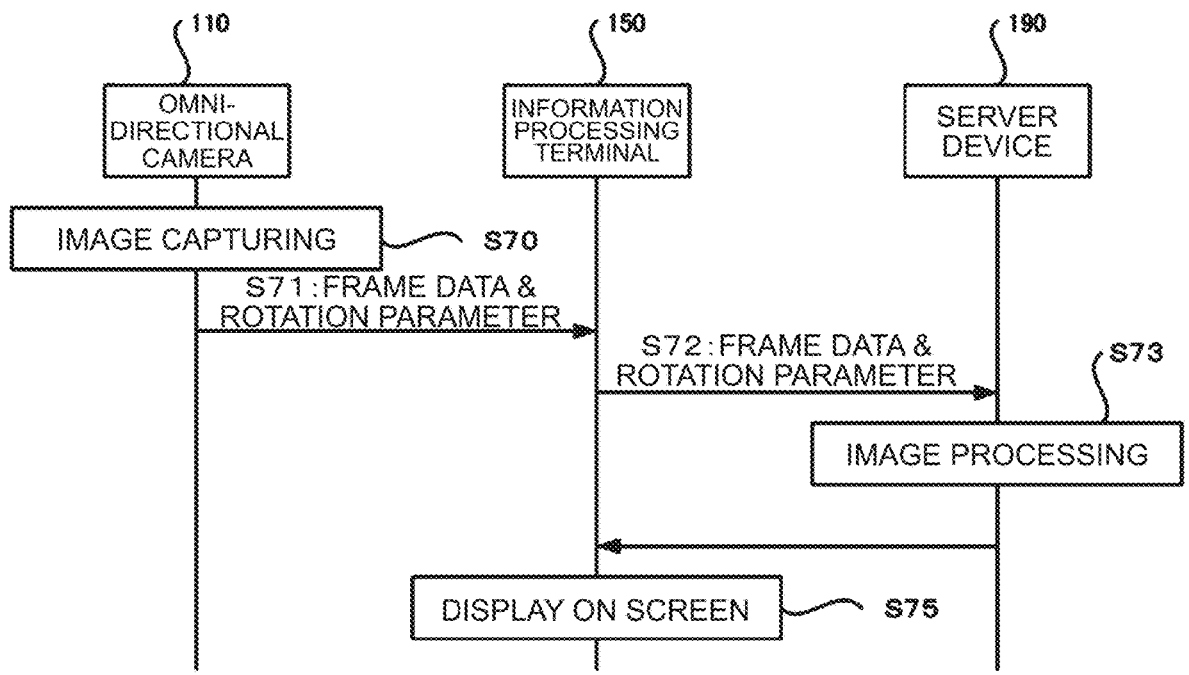

The omni-directional video system may include a server device 190, as indicated in FIG. 9B. According to the embodiment indicated in FIG. 9B, the omni-directional camera 110 performs only image capturing (S70), and the frame data and the rotation parameter before image processing are sent to the information terminal 150 (S71). The information terminal 150 transfers the received frame data and the rotation parameter to the server device 190 (S72), and activates the server device 190 to perform the image processing, such as the zenith correction and rotation correction, on the frame data (S73). The information terminal 150 downloads or receives streaming of the image-processed video data from the server device 190 (S74), and displays the image-processed video data on the screen of the display (S75). The access to the server device 190 is not limited to that by the information terminal 150.

According to the embodiment indicated in FIG. 9B, the server device 190 operates as an image processing apparatus that includes the video data acquisition means (reception unit), sensor data acquisition means (reception unit) and rotation correction means (means corresponds to the image rotation unit 230). The image composition unit 220, the first rotation amount calculation unit 224, and means corresponding to the first rotation amount calculation unit 224 may be disposed either in the omni-directional camera 110 or the server device 190.

If the omni-directional camera 110 includes a display device, the omni-directional video system may be constituted by the omni-directional camera 110 alone. In this case, the omni-directional camera 110 may display the image on the display device thereof.

Figure 10:
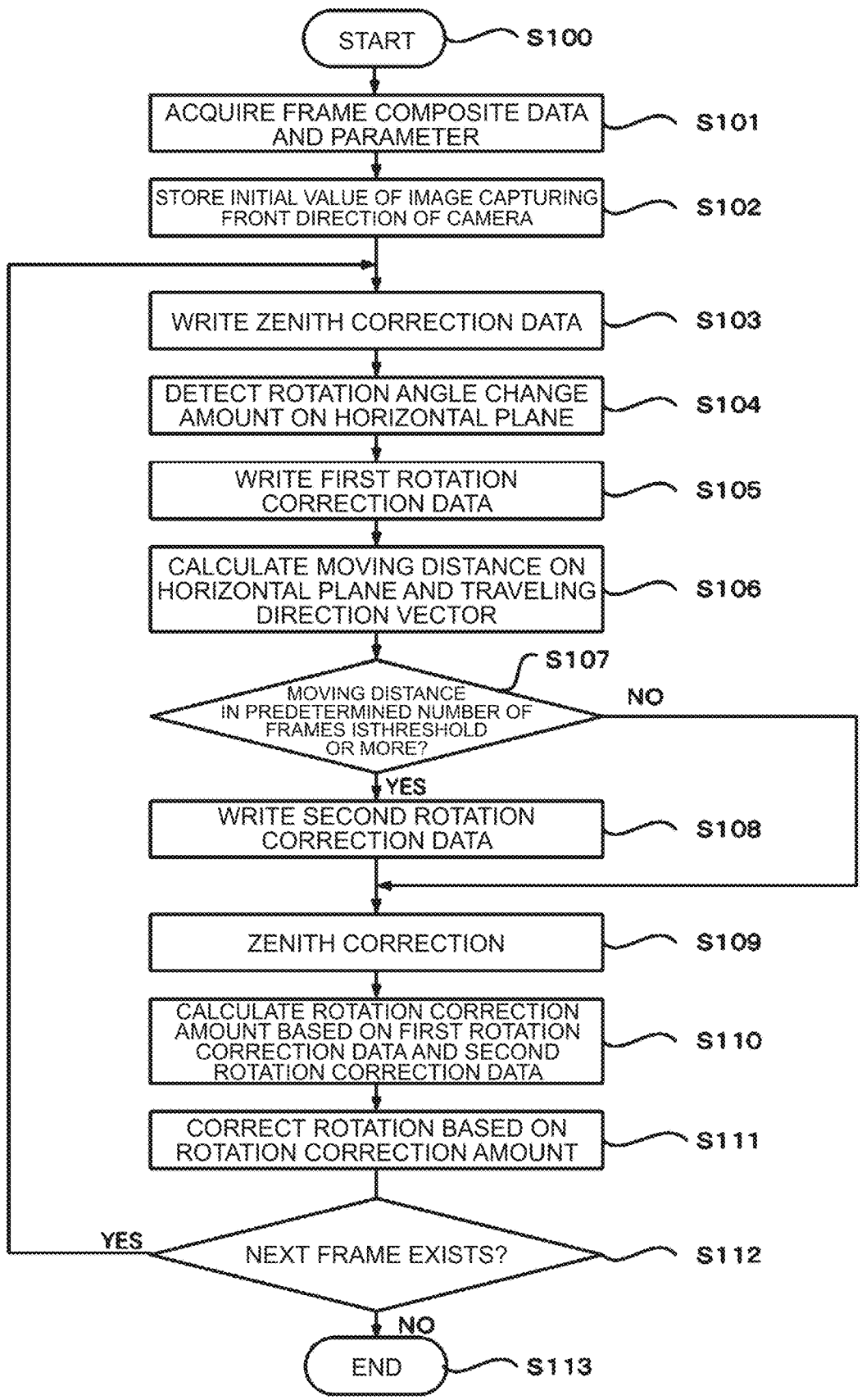
FIG. 10 is a flow chart depicting a rotation processing performed on frame composite data, that is executed by the omni-directional camera constituting the omni-directional video system according to the embodiment.

The zenith correction and rotation correction according to this embodiment will now be described in detail with reference to FIG. 10 to FIG. 13. FIG. 10 is a flow chart depicting the rotation processing for the frame composite data, which is executed by the omni-directional camera 110 constituting the omni-directional video system according to this embodiment (or by the information terminal 150 or the server device 190 according to a specific embodiment).

The processing indicated in FIG. 10 starts with step S100 responding to the omni-directional camera 110 receiving a request for corrected video data.

In step S101, the omni-directional camera 110 acquires the frame composite data and rotation parameter. To simplify description, it is assumed that recording of the first frame data and second frame data, generation of the frame composite data by image combining, and recording of the angular velocity data and acceleration data have already completed when the rotation processing starts. However according to another embodiment, the rotation processing indicated in FIG. 10 may be executed while sequentially performing recording of the first frame data and second frame data, recording of the angular velocity data and acceleration data, and generation of the frame composite data by the image combining (e.g. in the case of real-time distribution). In the following description, it is assumed that the zenith correction data, the first rotation correction data and second rotation correction data have not yet been calculated.

In step S102, the omni-directional camera 110 stores the initial value of the image capturing front direction of the omni-directional camera 110. The image capturing front direction of the omni-directional camera 110 at this start point is used to calculate the reference of the first rotation correction data and second rotation correction data. In step S102, the first frame is set as the processing target, and processing advances to step S103.

In step S103, using the zenith correction amount calculation unit 222, the omni-directional camera 110 calculates the inclination angle with respect to the gravity direction in the processing target frame based on at least the acceleration data, and writes the inclination angle to the zenith correction data.

In step S104, using the first rotation amount calculation unit 224, the omni-directional camera 110 detects the rotation angle change amount on the horizontal plane compared with the previous frame. In step S105, using the first rotation amount calculation unit 224, the omni-directional camera 110 integrates the angle change amount between the frames calculated in step S104, calculates the angle change amount of the image capturing front direction from the initial value, and writes the first rotation correction data. As mentioned above, the first rotation correction data is time series data of the angle change amount of the image capturing front direction in the target frame from the initial value of the image capturing front direction of the omni-directional camera 110 in the coordinate system on the horizontal frame.

The processing in step S103 to step S105 can be executed for each frame. The processing in step S106 to step S108, on the other hand, can be executed for each predetermined number of frames. The predetermined number of frames can be set to an arbitrary value. Followability increases as the predetermined number of frames decreases, but if the predetermined number of frames is too few, the blur components during traveling or the blur components during stopping more easily influence the video. Therefore, if a number of frames of the video per second is 60 (60 fps), the predetermined number of frames is preferably set to about 10 to 30, for example.

In step S106, using the second rotation amount calculation unit 226, the omni-directional camera 110 calculates the moving distance and the traveling direction vector of the omni-directional camera 110 in a predetermined number of frames in the coordinate system on the horizontal plane. The predetermined number of frames to be the target of the calculation may be a predetermined number of frames before and after the center frame if the stored omni-directional video data is reproduced, or may be a predetermined number of frames after the first frame if real-time distribution is performed.

In step S107, using the second rotation amount calculation unit 226, the omni-directional camera 110 determines whether the moving distance calculated in step S106 is a predetermined threshold or more. If it is determined that the moving distance is the predetermined threshold or more in step S107 (YES), processing advances to step S108. Here the moving distance refers to a difference between the position of the first frame and the position of the last frame in the coordinate system on the horizontal plane for a predetermined number of frames.

In step S108, using the second rotation amount calculation unit 226, the omni-directional camera 110 calculates the angle change amount of the traveling direction vector from the initial value calculated in S105, and writes the second rotation correction data. As mentioned above, the second rotation correction data is time series data of the difference between the initial value of the traveling direction vector (the same as the initial value of the camera direction) and the traveling direction vector, as an average of the traveling direction vectors for a predetermined number of frames.

If it is determined that the moving distance is the threshold or less in step S107 (NO), processing directly advances to step S109.

In step S109, using the image rotation unit 230, the omni-directional camera 110 performs the zenith correction on the target frame of the frame composite data based on the zenith correction data (inclination angle of the target frame thereof).

In step S110, using the image rotation unit 230, the omni-directional camera 110 calculates the rotation change amount (rotation correction amount) on the horizontal plane to be canceled in the target frame, based on the first rotation correction data and the second rotation correction data. As mentioned above, the first rotation correction data is a difference between the initial value of the image capturing front direction of the reference frame on the horizontal plane and the image capturing front direction at the timing of the target frame, and the second rotation correction data is a difference between the initial value of the traveling direction (the same as the image capturing front direction) of the reference frame on the horizontal plane and the traveling direction at the timing of the target frame. Therefore, the rotation change amount to be canceled ultimately can be calculated by adding the first rotation correction data and the second rotation correction data. If the specific direction is the initial value of the image capturing front direction, the second rotation correction data is a default value (zero) until the moving distance reaches the threshold or more, hence the rotation change amount becomes a value based on the difference between the initial value of the image capturing front direction and the image capturing front direction on the horizontal plane in the correction target frame on the horizontal frame, as specified in the first rotation correction data. If the specific direction is determined to be the traveling direction, on the other hand, the rotation change amount becomes a value based on the difference between the traveling direction and the image capturing front direction in the correction target frame.

In step S111, the omni-directional camera 110 performs the rotation correction on the target frame based on the calculated rotation correction amount.

In step S112, the omni-directional camera 110 determines whether the next frame exists. If it is determined that the next frame exists (YES) in step S112, processing returns to step S103. If it is determined that the next frame does not exist (NO) in step S112, this rotation processing ends in step S113.

By the above processing, correction is performed on the video throughout a plurality of frames at least in a predetermined period, to cancel the rotation change around the reference axis so that the reference of display approximately matches a specific direction during the image capturing.

According to the embodiment described above, the rotation amount to be canceled is calculated based on the first rotation correction data and the second rotation correction data in step S110, and rotation correction is performed all at once in step S111. However the present invention is not especially limited to this, and in another embodiment, the rotation correction based on the first rotation correction data and the rotation correction based on the second rotation correction may be performed sequentially. Further, in another embodiment, the zenith correction and the rotation correction may be performed all at once based on the zenith correction data, first rotation correction data and second rotation correction data.

By the above-mentioned rotation correction, the reference of display of an image can be fixed to a specific direction (e.g. initial image capturing front direction of the camera, traveling direction), regardless the rotation change at low frequency caused by head motion and the like.

Figure 11:
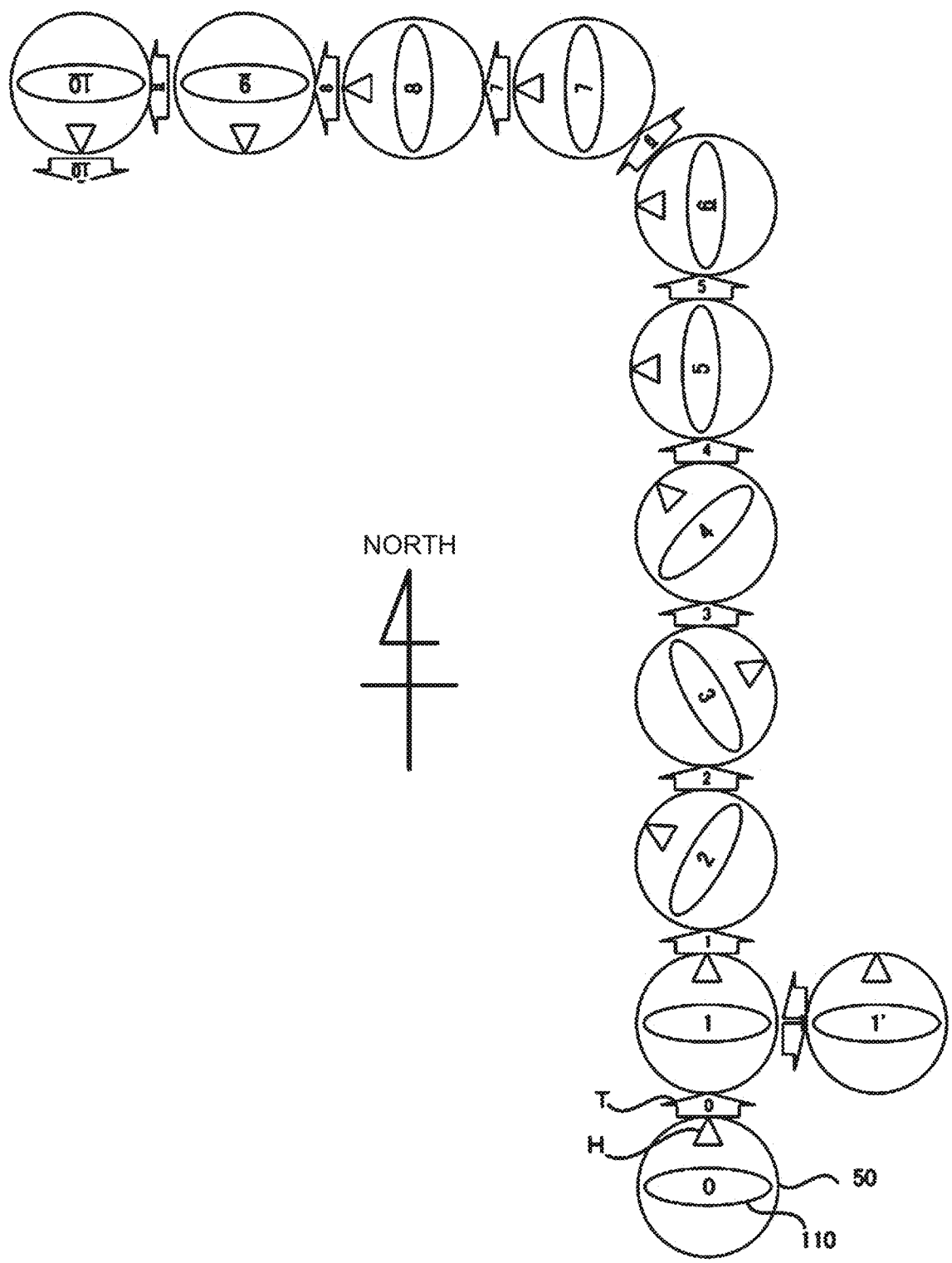
FIG. 11 is a diagram depicting an example of a relationship between the traveling direction and the image capturing front direction in the case where a cameraman, wearing the omni-directional camera on their head, is moving.
Figure 12:
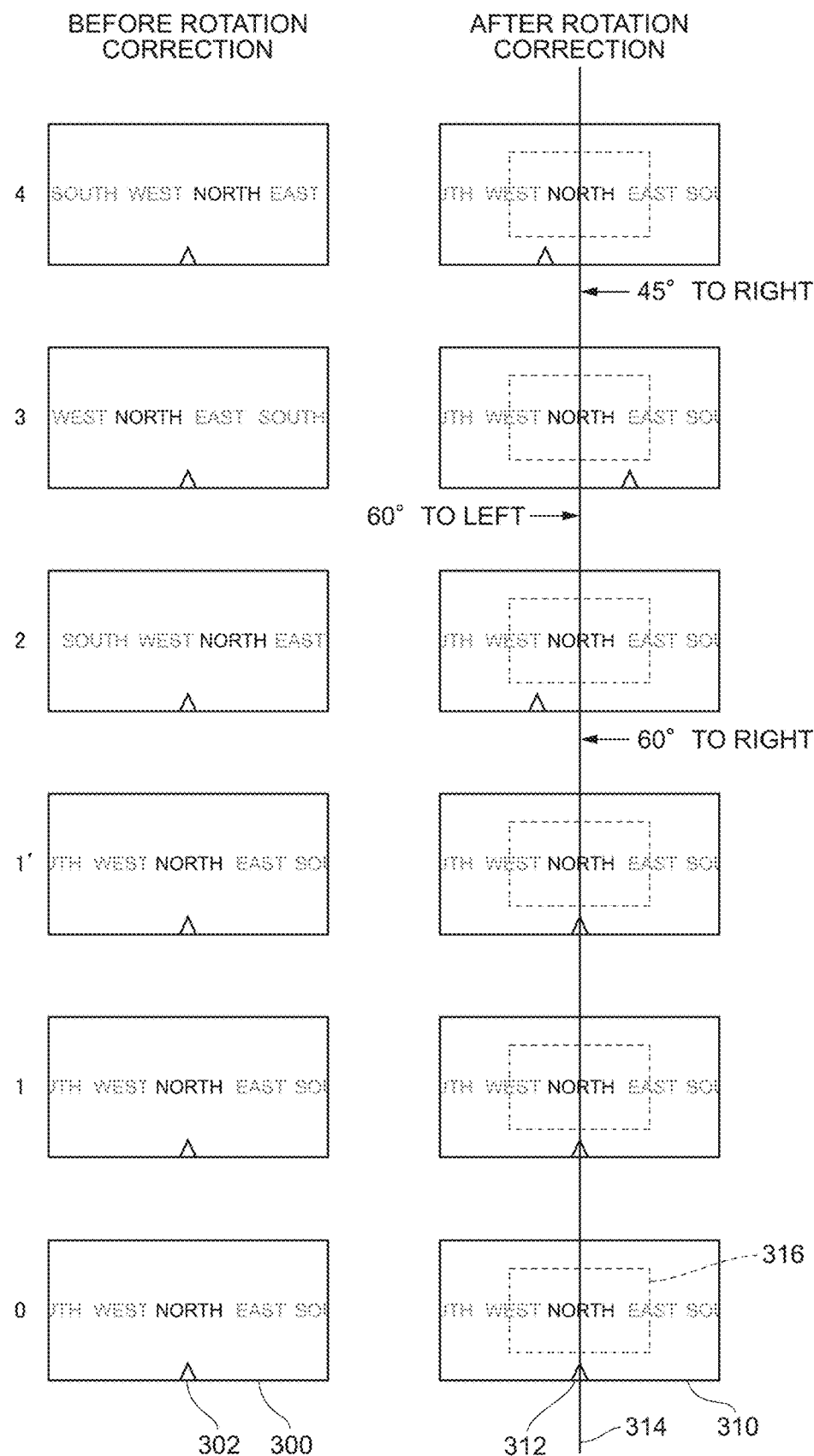
FIG. 12 is a diagram depicting an omni-directional image before rotation correction and the omni-directional image after the rotation correction in the case where the omni-directional image was captured when a cameraman performed the movement in FIG. 11 (1/2)
Figure 13:
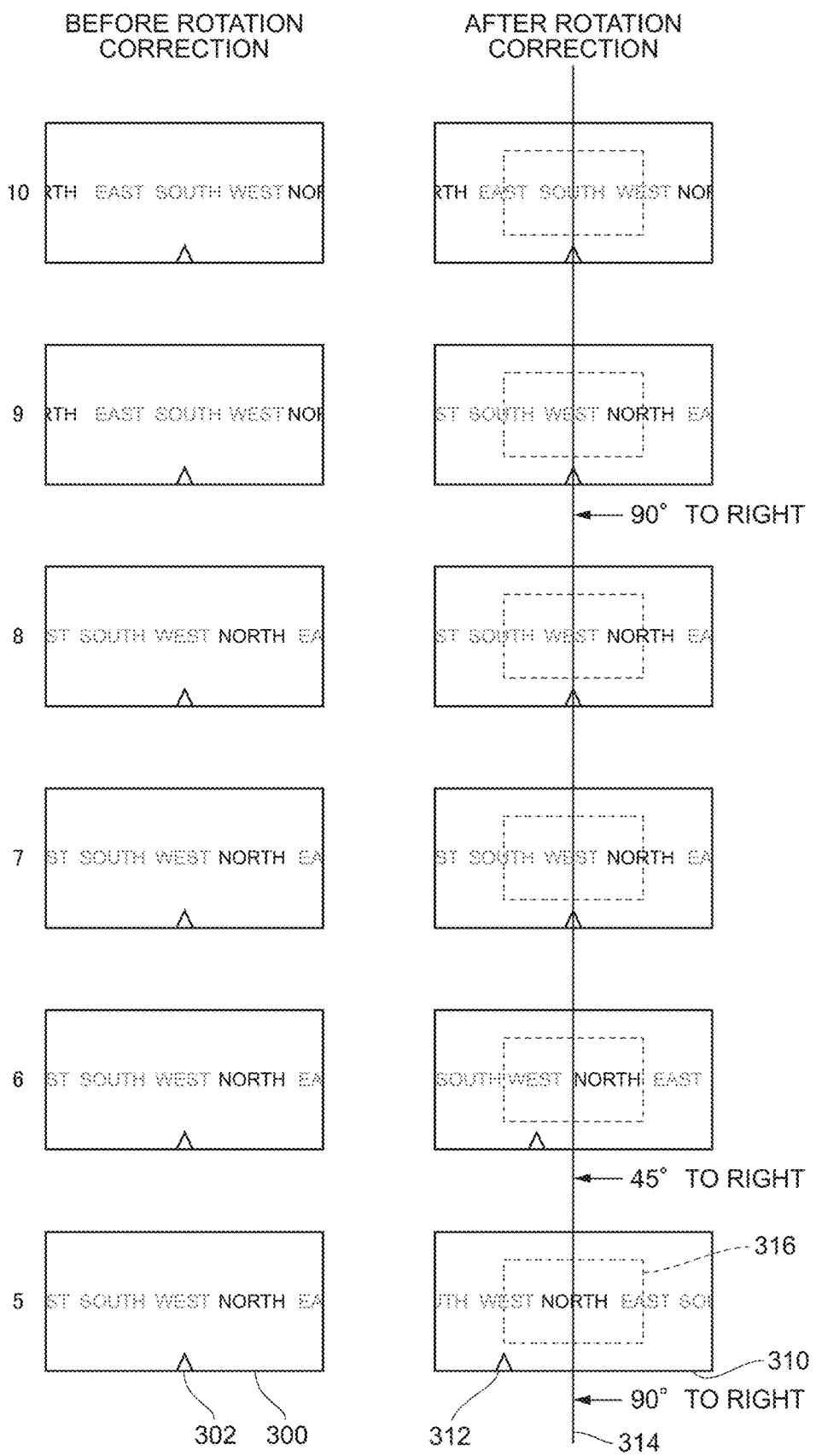
FIG. 13 is a diagram depicting an omni-directional image before rotation correction and the omni-directional image after the rotation correction in the case where the omni-directional image was captured when a cameraman performed the movement in FIG. 11 (2/2)

Now the relationship between the traveling direction and the image capturing front direction and the rotation processing by the image rotation unit at each timing thereof will be described with reference to FIG. 11 to FIG. 13. FIG. 11 is a diagram depicting an example of a relationship between the traveling direction T and the image capturing front direction H in the case where a cameraman moves wearing the omni-directional camera 110 on their head 50. FIG. 12 and FIG. 13 are diagrams depicting each omni-directional image before the rotation correction (on the left) and each omni-directional image after the rotation correction (on the right), which were captured when the cameraman performed the movement in FIG. 11.

FIG. 11 is a diagram where the time series is indicated by the numbers 0, 1, 1' and 1 to 10, and in FIG. 11 the state of the omni-directional camera 110 fixed on the head 50 of the cameraman at each timing indicated by each number is illustrated along with the traveling direction T of the cameraman (omni-directional camera 110) and the image capturing front direction H of the omni-directional camera 110 in accordance with the head motion.

In the example in FIG. 11, the traveling direction T indicates that the cameraman is traveling "North" in the period between Nos. 0 to 5. Further, in FIG. 11, the image capturing front direction H indicates that the cameraman is facing "North" at the timings of Nos. 0 and 1, which is the same as the traveling direction, then the cameraman looks around via head motion in the period between Nos. 2 and 4, and is facing "West", which is on the left side of the traveling direction at the timing of No. 5. The numbers 1 and 1' indicate the operation in which the cameraman moved parallel to the right and back to the original traveling path (e.g. moving out of the way for another individual to pass). Then the cameraman changes the traveling direction from "North" to "West" in the period between No. 6 and No. 7 while looking "West", and is traveling while looking "West", which is the same as the traveling direction, at the timings of Nos. 7 and 8. At the timing of No. 9, the cameraman is looking "South", which is on the left side of the traveling direction, while traveling "West", and at the timing of No. 10, the cameraman changes the traveling direction to "South" which the cameraman is already looking. North, South, East and West are indicated to simplify description, but the directions need not always be stipulated as North, South, East and West.

FIG. 12 and FIG. 13 are schematic diagrams depicting the omni-directional images before the rotation correction (left side) 300 and the omni-directional images after the rotation correction (right side) 310 corresponding to Nos. 0, 1, 1' and 1 to 10 indicated in FIG. 11. In each omni-directional image after the rotation correction (right side) 310, a predetermined range 316 which is set at the center of the omni-directional image, is displayed on the display screen of the information terminal 150.

In the periods of Nos. 0, 1, 1' and 1 to 5, the cameraman is traveling "North", but as the left side of FIG. 12 and FIG. 13 indicates, the image rotates in accordance with the head motion of the cameraman in the omni-directional images before correction 300. In concrete terms, in the periods of Nos. 0, 1, 1' and 1 to 5, the image capturing front direction 302 changes, as "North"→"Northwest (60° to the left from North)"→"Northeast (60° to the right from North)"→"Northwest (45° to the left from North)"→"West (90° to the left from North)". On the other hand, in the omni-directional image after correction 310, the reference 314 of display is always fixed to "North" (which is the image capturing front direction and the traveling direction at the start point), at each timing of Nos. 0, 1, 1' and 1 to 5, as indicated on the right side of FIG. 12 and FIG. 13. Further, in the parallel moving at the timings of Nos. 1 and 1', the moving direction of the omni-directional camera 110 changes momentarily, but this change occurs in such a short time that it is determined that the moving distance in a predetermined number of frames is less than the threshold in step S107 in FIG. 10, and the traveling direction remains "North" without an update.

The rotation correction will be described focusing on key points. In FIG. 11, at the timing of No. 2, the cameraman is traveling "North", while the omni-directional camera 110 turns 60° to the left and faces "Northwest". In this case, the image capturing front direction H of the omni-directional camera 110 is different from the traveling direction T of the cameraman. Here the rotation processing by the image rotation unit 230, when the cameraman changed to the state at the timing of No. 2 in FIG. 11, will be described. When the cameraman moves their head from the state at the timing of No. 1 to the state of the timing of No. 2, that is, when the direction of the image capturing apparatus turns 60° to the left, the image rotation unit 230 executes the rotation processing to rotate the image by 60° to the right, so as to cancel the rotation of the omni-directional image, based on the first rotation data. Thereby the default direction displayed on the screen can be fixed to the traveling direction. Actually the rotation processing based on the first rotation correction data is sequentially executed for each frame that changes from the state of the timing of No. 1 to the state of the timing of No. 2. In this case, the rotation processing based on the second rotation correction data is not executed since the traveling direction does not change. This is the same for the changes from the timing of No. 2 to the timing of No. 3, the change from the timing of No. 3 to the timing of No. 4, and the change from the timing of No. 4 to the timing of No. 5.

In the periods of No. 5 to No. 7, the cameraman gradually changes the traveling direction to "West", that is, the direction the cameraman is looking, but as the left side in FIG. 13 indicates, the cameraman is always looking "West" in the omni-directional image before correction 300, where images do not change. On the other hand, as the right side in FIG. 13 indicates, the reference 314 of display in the omni-directional image after correction 310 is fixed to the updated traveling direction "Northwest (No. 6)" and "West (No. 7)" respectively. Here the traveling direction at the timing of No. 6 is constant for a sufficiently long time, then this direction changes to the updated "Northwest".

Here the rotation processing by the image rotation unit, when the cameraman changed to the states at the timings of Nos. 5, 6 and 7 in FIG. 11, will be described. When the cameraman changes the traveling direction T from the state at the timing of No. 5 to the state at the timing of No. 6, without changing the image capturing front direction H, the image rotation unit 230 executes the rotation processing to rotate the image by 90° to the right so as to cancel the rotation of the omni-directional image with respect to the image capturing front direction from the initial value, if based on the first rotation correction data. On the other hand, the image rotation unit 230 executes the rotation processing to rotate the image by 45° to the left based on the difference of the traveling direction from the initial traveling direction (initial image capturing front direction) of the omni-directional image, if based on the second rotation correction data. Therefore, as a result of adding the first rotation correction data and the second rotation correction data, the image rotation unit 230 executes the rotation processing to rotate the image by 45° to the right.

In the state of the timing of No. 7, the image rotation unit 230 executes the rotation processing to rotate the image by 90° to the right so as to cancel the rotation of the omni-directional image with respect to the image capturing front direction from the initial value, if based on the first rotation correction data. On the other hand, the image rotation unit 230 executes the rotation processing to rotate the image by 90° to the left based on the difference of the traveling direction from the initial traveling direction (initial image capturing front direction) of the omni-directional image, if based on the second rotation correction data. Therefore, as a result of adding the first rotation correction data and the second rotation correction data, the rotation correction is not performed.

The change of the traveling direction may be interpolated so that the change from the previous traveling direction to the next traveling direction occurs smoothly. In other words, the 45° angle change in the period between the timing of No. 5 and the timing of No. 6 and the period between the timing of No. 6 and the timing of No. 7 may be smoothed by using the values interpolated in each period between these frames. As an alternative, it may be regarded that the traveling directions changed instantaneously. For example, the screen display may black out once so that the state of fixing the reference of display to the previous traveling direction can switch to the state of fixing the reference of display to the new traveling direction.

In the case of the change from the state of No. 8 to the state of No. 9, on the other hand, the cameraman changes the direction of looking from "West" to "South" without changing the traveling direction. In this case, as the left side in FIG. 13 indicates, the direction in which the cameraman is looking changes from "West" to "South", at the timings of No. 8 and No. 9, in the omni-directional image before correction 300, therefore as the right side in FIG. 13 indicates, the reference 314 of display is fixed to "West". At the timings of No. 9 and No. 10, on the other hand, the cameraman changes the traveling direction from "West" to "South" without changing the direction in which the cameraman is looking. In this case, as the left side in FIG. 13 indicates, at the timings of No. 9 and No. 10, the direction in which the cameraman is looking is always "South" in the omni-directional image before correction 300, but as the right side in FIG. 13 indicates the traveling direction changes from "West" to "South", where the reference 314 of display is fixed.

Here the rotation processing by the image rotation unit, when the cameraman changed to the states at the timings of No. 8, 9 and 10 in FIG. 11, will be described. When the cameraman changes the image capturing front direction H from the state at the timing of No. 8 to the state at the timing of No. 9, without changing the traveling direction T, the image rotation unit 230 executes the rotation processing to rotate the image by 180° to the right so as to cancel the rotation of the omni-directional image with respect to the image capturing front direction from the initial value, if based on the first rotation correction data. On the other hand, the image rotation unit 230 executes the rotation processing to rotate the image by 90° to the left based on the difference of the traveling direction from the initial traveling direction (initial image capturing front direction) of the omni-directional image, if based on the second rotation correction data. Therefore, as a result of adding the first rotation correction data and the second rotation correction data, the image rotation unit 230 executes the rotation processing to rotate the image by 90° to the right. In the state at the timing of No. 10, the image rotation unit 230 executes the rotation processing to rotate the image] 180° to the right, so as to cancel the rotation of the omni-directional image with respect to the image capturing front direction from the initial value, if based on the first rotation correction data. On the other hand, the image rotation unit 230 executes the rotation processing to rotate the image by 180° to the left based on the differences of the traveling direction from the initial traveling direction (initial image capturing front direction) of the omni-directional image, if based on the second rotation correction data. Therefore, as a result of adding the first rotation correction data and the second rotation correction data, the rotation correction is not performed.

In this way, the default direction displayed on the screen can be fixed to either the image capturing front direction or the traveling direction at the start of the image capturing.

Figure 14:
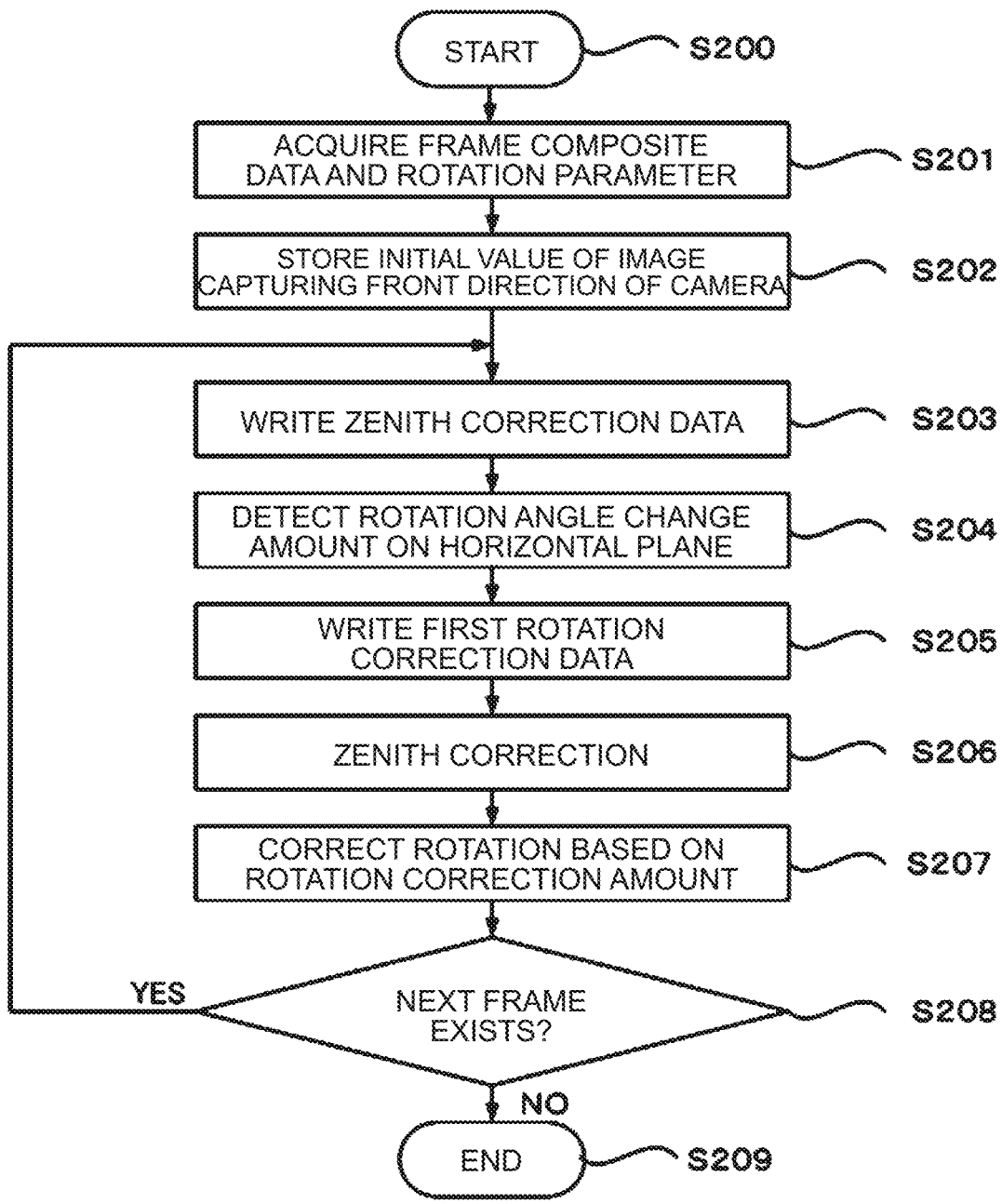
FIG. 14 is a flow chart depicting a rotation processing performed on frame composite data that is executed by the omni-directional camera constituting the omni-directional video system according to another embodiment.

The zenith correction and the rotation correction according to another embodiment will now be described in detail with reference to FIG. 14. FIG. 14 is a flow chart depicting the rotation processing for the frame composite data, which is executed by the omni-directional camera 110 constituting the omni-directional video system according to another embodiment (or by the information terminal 150 or by the server device 190 according to a specific embodiment). FIG. 14 indicates an embodiment where the traveling direction is not determined, and the reference of display is always fixed to the image capturing front direction at the start of the image capturing.

The processing indicated in FIG. 14 starts with step S200, responding to the omni-directional camera 110 receiving a request for corrected video data.

In step S201, the omni-directional camera 110 acquires the frame composite data and rotation parameter. To simplify description, it is assumed that the recording of the first frame data and second frame data, generation of the frame composite data by image combining, and recording of the angular velocity data and acceleration data have already completed when the rotation processing starts, the same as the case of the embodiment in FIG. 10.

In step S202, the omni-directional camera 110 stores the initial value of the image capturing front direction of the omni-directional camera 110. In step S203, using the zenith correction amount calculation unit 222, the omni-directional camera 110 calculates the inclination angle with respect to the gravity direction in the processing target frame based on at least the acceleration data, and writes the inclination angle to the zenith correction data.

In step S204, using the first rotation amount calculation unit 224, the omni-directional camera 110 integrates the angle change amount in the coordinate system on the horizontal plane at each clock, and detects the rotation angle change amount on the horizontal plane compared with the previous frame. In step S205, using the first rotation amount calculation unit 224, the omni-directional camera 110 integrates the angle change amount between frames calculated in step S204, calculates the angle change amount of the image capturing front direction from the initial value, and writes the first rotation correction data.

In step S206, using the image rotation unit 230, the omni-directional camera 110 performs the zenith correction on the target frame of the frame composite data based on the zenith correction data (inclination angle of the target frame thereof).

In step S207, using the image rotation unit 230, the omni-directional camera 110 performs the rotation correction on the target frame based on the first rotation correction data. As mentioned above, the first rotation correction data is a difference between the initial value of the image capturing front direction of the reference frame on the horizontal plane and the image capturing front direction at the timing of the target frame, and indicates the rotation change amount on the horizontal plane to be canceled in the target frame.

In step S208, the omni-directional camera 110 determines if the next frame exists. If it is determined that the next frame exists (YES) in step S208, processing returns to step S203. If it is determined that the next frame does not exist (NO) in step S208, this processing ends in step S209.

By the above processing, correction is performed on the video throughout a plurality of frames in a period from the start to the end of the image capturing, to cancel the rotation change around the reference axis, so that the reference of display approximately matches the image capturing front direction at the start of the image capturing.

As described above, according to this embodiment, an image processing apparatus, an image capturing apparatus, a video reproducing system, method and program that can suppress motion sickness of the viewer when viewing a video, caused by the rotation around the reference axis during image capturing, can be provided.

According to a specific embodiment, the reference of display when viewing is fixed to the traveling direction of the cameraman, hence not only is motion sickness of the viewer suppressed, but also the viewer can experience a realistic sensation close to the actual scene that they are observing.

According to the above embodiment, it is assumed that the omni-directional camera 110 is fixed to the head 50 of the cameraman. The rotation correction function of this embodiment can be suitably applied in such a case, but the scene where the rotation correction function can be applied is not especially limited, and needless to say, the rotation correction function can also be applied to the case where the user, holding the camera, captures images.

Further, according to the above embodiment, it is assumed that the first rotation correction data and the second rotation correction data are calculated using the angular velocity sensor 136A and the acceleration sensor 136B. However, according to another embodiment, when the angle change amount is calculated, the first rotation correction data and the second rotation correction data may be calculated using a geomagnetic sensor. In this case, the initial value of the geomagnetic sensor is stored, then the rotation angle in the coordinate system on the horizontal plane is calculated based on the difference between the initial value of the geomagnetic sensor and the direction indicated by the geomagnetic sensor in a target frame, and the first rotation correction data and the second rotation correction data are calculated. Further, in the above description, it is assumed that the frame composite data, acceleration data and angular velocity data are stored in advance, but this rotation correction function can be applied not only to the stored video data, but also to a stream of video data that is distributed in real-time.

Further, according to the above embodiment, it is assumed that the zenith correction is performed on the video in the spherical coordinate system which includes two angular coordinates. However, depending on an embodiment, a major inclination in the gravity direction which requires the zenith correction may not be generated. In such a case, the zenith correction may be omitted. In this case, the reference axis may be the axis of the angular coordinate if the coordinate system is a cylindrical coordinate system that includes one angular coordinate, or may be an axis that provides two angular coordinates if the coordinate system is a spherical coordinate system that includes two angular coordinates.

The above functional units can be implemented by a computer-executable program written in a legacy programming language (e.g. assembly, C, C++, C #, Java®) or an object oriented programming language, and can be distributed via an electronic communication line or by being stored in a device-readable storage medium (e.g. ROM, EEPROM, EPROM, flash memory, flexible disk, CD-ROM, CD-RW, DVD-ROM, DVD-RAM, DVD-RW, Blu-ray disk, SD card, MO). A part or all of the above functional units can be installed on a programmable device (PD), such as a field programmable gate array (FPGA), or can be installed as an application specific integrated circuit (ASIC). The above functional units can be distributed by a recording medium, as circuit configuration data for download to a PD to implement the function units on the PD (bit stream data), and data written by a hardware description language (HDL), a very high-speed integrated circuit hardware description language (VHDL), Verilog_HDL or the like, to generate circuit configuration data.

Embodiments of the present invention have been described, but the embodiments of the present invention are not limited to the above embodiments, and may be changed within a scope arrived at by an expert in the art, including adding, changing and deleting, and all these modes are included in the scope of the present invention as long as the functions and the effects of the invention can be implemented.

What is claimed is:

1. An image processing apparatus comprising:
   a central processing unit that processes a video including continuous images, expressed by a coordinate system which includes at least an angular coordinate around a predetermined axis, and
   a memory in communication with the central processing unit, the memory having computer readable instructions stored thereupon that, when executed by the central processing unit, cause the central processing unit to:
   acquire video data;
   acquire sensor data corresponding to the video data, the sensor data comprising first rotation correction data and second rotation correction data; and
   correct an image to cancel rotation change around the reference axis based on the first rotation correction data and the second rotation correction data, so that a reference of display of the image is fixed to a specific direction during image capturing throughout a plurality of frames of the video;
   wherein the first rotation correction data is time series data of a first angle change amount of image capturing in a front direction with respect to a reference value, and the second rotation correction data is time series data of a second angle change amount of a traveling direction with respect to the reference value.

2. The image processing apparatus according to claim 1, wherein
   a direction on a plane, which is vertical to the reference axis based on a posture of a camera which captures the video in a reference frame at a predetermined timing, is determined as the specific direction during the image capturing, and the amount of the rotation change is based on a difference between the direction based on the posture in a reference frame and the direction on the plane vertical to the reference axis based on the posture of the camera in a correction target frame.

3. The image processing apparatus according to claim 2, wherein
   the predetermined timing is a timing when the capturing of the video is started or a timing when an instruction is accepted while capturing the video.

4. The image processing apparatus according to claim 2, wherein
   a predetermined period corresponding to the plurality of frames is a period from a first timing when the start of the video or the start of the fixing is instructed to a second timing when the end of the video or the end of the fixing is instructed.

5. The image processing apparatus according to claim 1, wherein the computer readable instructions, when executed by the central processing unit, further cause the central processing unit to:
   determine the traveling direction of the camera, which is moving on the plane vertical to the reference axis, as a specific direction during the image capturing;
   wherein in the case where the traveling direction is determined as the specific direction, the amount of the rotation change is based on the difference between the traveling direction and the direction on the plane vertical to the reference axis based on the posture of the camera in a correction target frame.

6. The image processing apparatus according to claim 5, wherein
   in the case where a moving distance in a predetermined number of frames satisfies a predetermined condition, the computer readable instructions cause the central processing unit to determine an updated traveling direction as the specific direction during the image capturing based on the sensor data,
   and the predetermined period corresponding to the plurality of frames, which corresponds to the determined specific direction during the image capturing, is a period from this determination to the next determination.

7. The image processing apparatus according to claim 1, wherein
   the coordinate system further includes an angular coordinate with respect to the predetermined axis, and
   the computer readable instructions, when executed by the central processing unit, further cause the central processing unit to correct the zenith for each frame of the video based on an inclination angle with respect to the reference axis during the image capturing in each frame of the video so that the predetermined axis approximately matches the reference axis.

8. The image processing apparatus according to claim 1, wherein:
   the video includes an omni-directional image which is expressed by a coordinate system including two angular coordinates as a frame,
   the video is a video captured by a plurality of image capturing elements,
   the omni-directional image is constituted by combining a plurality of partial images captured by the plurality of image capturing elements,
   the video data includes the omni-directional image or the plurality of partial images as each frame, and
   the correction is performed on the omni-directional image or the plurality of partial images, and the reference axis is the gravity direction.

9. The image processing apparatus according to claim 1, further comprising:
   at least one of an acceleration sensor, an angular velocity sensor, and a geomagnetic sensor;
   wherein the sensor data corresponding to the video includes at least one of: data outputted by the acceleration sensor, data outputted by the angular velocity sensor, data outputted by the geomagnetic sensor, and the first rotation correction data and the second rotation correction data that are respectively calculated based on the data outputted by at least one of these sensors.

10. A video reproducing system comprising:
    a central processing unit that reproduces a video including continuous images, expressed by a coordinate system which includes at least an angular coordinate around a predetermined axis,
    a display, and
    a memory in communication with the central processing unit, the memory having computer readable instructions stored thereupon that, when executed by the central processing unit, cause the central processing unit to:

acquire video data;

acquire sensor data corresponding to the video data, the sensor data comprising first rotation correction data and second rotation correction data;

correct an image to cancel rotation change around the reference axis based on the first rotation correction data and the second rotation correction data, so that a reference of display of the image is fixed to a specific direction during image capturing throughout a plurality of frames of the video; and display at least a part of the corrected videos on a screen of the display based on the reference of display;

wherein the first rotation correction data is time series data of a first angle change amount of image capturing in a front direction with respect to a reference value, and the second rotation correction data is time series data of a second angle change amount of a traveling direction with respect to the reference value.

11. The video reproducing system according to claim 10, the computer readable instructions, when executed by the central processing unit, further cause the central processing unit to: calculate the specific direction during the image capturing on a plane coordinate system which is in the vertical direction with respect to the reference axis.

12. The video reproducing system according to claim 10, the computer readable instructions, when executed by the central processing unit, further cause the central processing unit to:

capture an image of each frame of a video, and record output data of a sensor or correction data calculated from this output data, in association with each frame of the video, or receive output data of a sensor or correction data calculated from this output data, along with each frame of the video.

13. A method of processing a video including continuous images expressed by a coordinate system which includes at least an angular coordinate around a predetermined axis, that is executed by a central processing unit, which comprises:

acquiring video data;

acquiring sensor data corresponding to the video data, the sensor data comprising first rotation correction data and the second rotation correction data; and correcting an image to cancel rotation change around the reference axis based on the first rotation correction data and the second rotation correction data, so that a reference of display of the image is fixed to a specific direction during image capturing throughout a plurality of frames of the video;

wherein the first rotation correction data is time series data of a first angle change amount of image capturing in front direction with respect to a reference value, and the second rotation correction data is time series data of a second angle change amount of a traveling direction with respect to the reference value.

14. A non-transitory recording medium recording computer readable instructions, when executed by a central processing unit, cause the central processing unit to:

process a video, including continuous images expressed by a coordinate system which includes at least an angular coordinate around a predetermined axis;

acquire video data;

acquire sensor data corresponding to the video data, the sensor data comprising first rotation correction data and second rotation correction data; and correct an image to cancel rotation change around the reference axis based on the first rotation correction data and the second rotation correction data, so that a reference of display of the image is fixed to a specific direction during image capturing throughout a plurality of frames of the video;

wherein the first rotation correction data is time series data of a first angle change amount of image capturing in a front direction with respect to a reference value, and the second rotation correction data is time series data of a second angle change amount of a traveling direction with respect to the reference value.

* * * * *